US010297398B2

(12) United States Patent
Nishita et al.

(10) Patent No.: US 10,297,398 B2
(45) Date of Patent: May 21, 2019

(54) POROUS CARBON MATERIAL FOR ELECTRODE OF ENERGY STORAGE DEVICE AND METHOD FOR MANUFACTURING SAID MATERIAL

(71) Applicant: Kuraray Co., Ltd., Kurashiki-shi (JP)

(72) Inventors: Yumika Nishita, Bizen (JP); Shushi Nishimura, Bizen (JP); Yoshifumi Egawa, Bizen (JP); Kiyoto Otsuka, Bizen (JP)

(73) Assignee: KURARAY CO., LTD., Kurashiki-shi (JP)

( * ) Notice: Subject to any disclaimer, the term of this patent is extended or adjusted under 35 U.S.C. 154(b) by 191 days.

(21) Appl. No.: 15/306,956

(22) PCT Filed: Apr. 21, 2015

(86) PCT No.: PCT/JP2015/062103
§ 371 (c)(1),
(2) Date: Oct. 26, 2016

(87) PCT Pub. No.: WO2015/166839
PCT Pub. Date: Nov. 5, 2015

(65) Prior Publication Data
US 2017/0047173 A1    Feb. 16, 2017

(30) Foreign Application Priority Data

Apr. 28, 2014  (JP) .................................. 2014-092892

(51) Int. Cl.
*H01M 4/02*  (2006.01)
*H01G 11/86* (2013.01)
(Continued)

(52) U.S. Cl.
CPC ............. *H01G 11/86* (2013.01); *H01G 11/32* (2013.01); *H01G 11/42* (2013.01); *H01G 11/44* (2013.01);
(Continued)

(58) Field of Classification Search
CPC ........ H01G 11/32; H01G 11/42; H01G 11/44; H01G 11/86; H01M 4/587; H01M 4/62; H01M 4/624; Y02E 60/13
See application file for complete search history.

(56) References Cited

U.S. PATENT DOCUMENTS

| | | | |
|---|---|---|---|
| 2010/0175822 A1* | 7/2010 | Eguchi ................... | H01G 9/058 156/246 |
| 2013/0026969 A1* | 1/2013 | Kim ....................... | A61N 1/3785 320/103 |
| 2015/0030936 A1 | 1/2015 | Matsumura | |

FOREIGN PATENT DOCUMENTS

| | | |
|---|---|---|
| CN | 101388291 A | 3/2009 |
| CN | 101604580 A | 12/2009 |

(Continued)

OTHER PUBLICATIONS

International Search Report dated Jul. 14, 2015 in PCT/JP2015/062103 filed Apr. 21, 2015.

(Continued)

*Primary Examiner* — Jacob B Marks
(74) *Attorney, Agent, or Firm* — Oblon, McClelland, Maier & Neustadt, L.L.P.

(57) ABSTRACT

A porous carbon material for electrodes of energy storage devices comprising: a porous carbon material; 0.5 to 5 parts by mass of an insulating material having a boiling point of 150° C. or more based on 100 parts by mass of the porous carbon material; and 0.25 to 15 parts by mass of a conductive additive based on 100 parts by mass of the insulating material, wherein the insulating material and the conductive additive are carried on the porous carbon material in combination, and the porous carbon material has a BET specific surface area of 1300 to 2050 $m^2/g$.

11 Claims, 11 Drawing Sheets

(51) Int. Cl.
*H01G 11/42* (2013.01)
*H01G 11/44* (2013.01)
*H01G 11/32* (2013.01)
*H01M 4/587* (2010.01)
*H01M 4/62* (2006.01)

(52) U.S. Cl.
CPC ........... *H01M 4/587* (2013.01); *H01M 4/624* (2013.01); *H01M 4/625* (2013.01); *H01M 4/628* (2013.01); *Y02E 60/13* (2013.01); *Y02T 10/7022* (2013.01)

(56) References Cited

FOREIGN PATENT DOCUMENTS

| JP | 9-63905 A | 3/1997 | | |
| JP | 10-116755 A | 5/1998 | | |
| JP | 2000-323362 A | 11/2000 | | |
| JP | 2005-132702 A | 5/2005 | | |
| JP | 2008-37682 A | 2/2008 | | |
| JP | 2011-049231 | * 8/2009 | ............. | H01G 9/058 |
| JP | 2011-49231 A | 3/2011 | | |
| JP | 2012-84359 A | 4/2012 | | |
| JP | 2012-124388 A | 6/2012 | | |
| JP | 5287601 B2 | 9/2013 | | |
| JP | 2014-42063 A | 3/2014 | | |
| JP | 5601485 B2 | 10/2014 | | |
| WO | 2013/128776 A1 | 9/2013 | | |

OTHER PUBLICATIONS

Office Action dated Aug. 28, 2018, in Japanese Patent Application No. 2016-516325, filed Apr. 21, 2015 w/English translation.
Combined Chinese Office Action and Search Report dated Nov. 23, 2017, in Patent Application No. 201580023621.4 (with English translation), citing documents AO—AR therein, 16 pages.
English translation of the International Preliminary Report on Patentability and Written Opinion dated Nov. 1, 2016 in PCT/JP2015/062103.

* cited by examiner

POROUS CARBON MATERIAL FOR ELECTRODE OF ENERGY STORAGE DEVICE AND METHOD FOR MANUFACTURING SAID MATERIAL

TECHNICAL FIELD

The present application claims the Paris Convention priority based on Japan Patent Application No. 2014-092892 (filed on Apr. 28, 2014), and the entire content of which is incorporated herein by reference.

The present invention relates to a porous carbon material for energy storage devices which is effective in an improvement in endurance, inhibition of a gas generation and improvement in withstand voltage, and a method for manufacturing said material.

BACKGROUND ART

An electric double layer capacitor which is one of the energy storage devices is excellent in the output characteristic and the life characteristic as compared with a cell. With taking advantage of these characteristics, the electric double layer capacitor is developed in many applications such as a backup of various memories, power assistance of cars and trains, an electricity storage application such as UPS (Uninterruptible Power Supply), and the like, and is put in practical use. In recent years, because of the above-mentioned outstanding characteristics, the electric double layer capacitor draws attention as an auxiliary power of electric vehicles (EV) and hybrid cars (HV) and a use in regeneration energy storage. Such an energy storage device for vehicles is used under a more severe operating condition as compared with a household use. In addition to higher energy density, a capacity maintenance over a longer period and higher durability are required.

An electricity storage process using an electrical double layer does not accompany any chemical reaction, and thus, it is theoretically excellent in temperature characteristics or durability. However, gas is actually generated by decomposition of an electrolyte or an electrolytic solution, and causes a decrease in durability and capacity. Water may exist on the surface of carbon materials such as activated carbon used in the energy storage device. When the carbon materials are dried in the process for producing an electrode, the water is not sufficiently eliminated or removed. Although it is not certain, the deterioration becomes remarkable by the following phenomena: remaining water produces $H_2$ gas and $OH^-$ in a reductive degradation; and $OH^-$ activates a hydrolysis of solvents such as an electrolyte and an electrolytic solution. It is also said that an electrochemical and oxidative degradation of the electrolytic solution or the electrolyte causes polymerizing and fluorination and affects durability.

Patent document 1 proposes an electric double layer capacitor by which decrease in the discharge capacity is inhibited. The capacitor uses an activated carbon having a certain ratio of oxygen atom/carbon atom as a base material, and was made under the thought that oxygen comprised in an activated carbon reacts with a solute in the electrolyte when the activated carbon comprises high amount of oxygen. Patent document 1 discloses that a heat treatment is carried out at a temperature of 500-1100° C. so as to obtain the activated carbon having a certain ratio of oxygen atom/carbon atom. Patent document 2 proposes a process for producing an activated carbon and a production equipment used therefor. In that process, a time degradation is inhibited by carrying out the heat treatment at the temperature of 500-1100° C. when a mesophase-related soft carbon, which has a high generation of gas and a high decrease in the capacity, is used as a raw material for producing the activated carbon. Although both processes reveal a certain effect, both processes require the high temperature of 500-1000° C. which increases manufacturing cost. In addition, the treatment at high temperature sometimes causes thermal contraction of the activated carbon, and thus, the processes may be unable to satisfy the high demand from a market for electrostatic capacitance.

Patent document 3 discloses that the increase in the capacity and the improvement in durability are achieved by the use of activated carbon particles as a negative electrode active material in a Li-ion type electrical storage device. The activated carbon particles are spherical and have a submicron average particle diameter, and carry siloxane on the surface and in pores thereof with the use of an organic solvent. However, the siloxane itself carried on the surface of the activated carbon serves as an insulator, turns into a resistance object between particles, and may reduce input and output properties.

Patent document 4 proposes an electric double layer capacitor with a good life property. In the capacitor, a silane compound or a silazane compound is used as a surface modifier; alkoxy groups eliminated from the silane compound or the silazane compound connect with the surface of the activated carbon; and thus, an improvement in the contact ability with an electrolyte and smooth adsorption and desorption of ions are achieved. Although the document discloses that the reduction in capacity is inhibited by this method, a gas generation which is one of the practical problems is not considered at all. Moreover, when the added surface modifier remains in an unreacted state, the surface modifier may cause a gas generation or may promote the deterioration of an electrolytic solution. In addition, the invention of the document uses a surface modifier having a low flash point, and thus, a concern which needs consideration is left behind on drying the electrode.

Patent document 5 discloses that active sites in the surface of an activated carbon are covered by contacting a silicone oxide or a metal oxide with at least one part of the surface and by hydrolyzing them to inhibit decomposition of an electrolytic solution and to improve withstand voltage of a cell. However, the metal oxide disclosed in the document becomes an insulator or a resistance object like the siloxane indicated in patent documents 3, and thus, it causes an increase in resistance which may have a negative effects on input and output properties. Moreover, decomposition of the metal oxide, etc. causes deposition of the metal during charge or discharge process, and it is apprehensive that the metal may cause a short circuit or may promote deterioration.

Patent document 6 discloses that, with the use of a supercritical coating method, a base material having pores is coated with either an insulating oxide or an electrochemically reactive oxide which may reversibly and electrochemically react with an electrolytic solution. By such a coating, the surface including the inner surface of pores is evenly coated (quantitatively, 90% or more of surface area); direct contact of the base material with the electrolytic solution is avoided; decomposition of the electrolytic solution is inhibited; and thus, a material which is excellent in the input and output properties is provided. However, the oxide disclosed in patent document 6 may become an insulator or a resistance object like the siloxane indicated in patent document 3, and thus, it may increase resistance and may have a bad influence on input and output properties. Moreover, there is a possibility that the performance may fall due to the deterioration of the oxide by an oxidation-reduction thereof.

BACKGROUND ART

[Patent Citation 1] JP 10-116755 A
[Patent Citation 2] JP 4392223 B
[Patent Citation 3] JP 2012-84359 A
[Patent Citation 4] JP 2012-124388 A
[Patent Citation 5] JP H09-063905 A
[Patent Citation 6] JP 4296332 B

DISCLOSURE OF INVENTION

Technical Problem

The problem to be solved by the present invention is made in view of the above-mentioned actual circumstance, and is to provide a porous carbon material for electrodes of energy storage devices and a production method thereof, which is effective in improvement in durability, inhibition of a gas generation, and improvement in withstand voltage.

Technical Solution

The inventors found the present invention, as a result of repeating examination in detail regarding the porous carbon material for electrodes of energy storage devices and its production method, so as to solve the above-mentioned problem.

That is, the present invention includes the following preferable embodiments.

(1) A porous carbon material for electrodes of energy storage devices comprising:
a porous carbon material;
0.5 to 5 parts by mass of an insulating material having a boiling point of 150° C. or more based on 100 parts by mass of the porous carbon material; and
0.25 to 15 parts by mass of a conductive additive based on 100 parts by mass of the insulating material;
wherein, the insulating material and the conductive additive are carried on the porous carbon material in combination, and the porous carbon material has a BET specific surface area of 1300 to 2050 $m^2/g$.

(2) The porous carbon material for electrodes of energy storage devices according to (1), wherein kinetic viscosity at 25° C. of the insulating material is 1 to 1000 $mm^2/s$.

(3) The porous carbon material for electrodes of energy storage devices according (1) or (2), wherein pour point of the insulating material is −30° C. or less.

(4) The porous carbon material for electrodes of energy storage devices according to any one of (1) to (3), wherein the insulating material is a siloxane compound having siloxane units in a main chain.

(5) The porous carbon material for electrodes of energy storage devices according to any one of (1) to (4), wherein a high-molecular compound is also carried in combination.

(6) A method for manufacturing a porous carbon material for electrodes of energy storage devices having a BET specific surface area of 1300 to 2050 $m^2/g$, wherein 0.5 to 5 parts by mass of an insulating material having a boiling point of 150° C. or more based on 100 parts by mass of a porous carbon material, and 0.25 to 15 parts by mass of a conductive additive based on 100 parts by mass of the insulating material are carried on the porous carbon material.

(7) The method according to (6), wherein the insulating material and the conductive additive are added to the porous carbon material to be carried on the porous carbon material.

(8) The method according to (6), wherein a mixture comprising the insulating material and the conductive additive are added to the porous carbon material to be carried on the porous carbon material.

(9) The method according to (6), wherein the insulating material and the conductive additive are carried on the porous carbon material by dipping the porous carbon material into a mixture comprising the insulating material and the conductive additive.

(10) The method according to (8) or (9), wherein the mixture further comprises a high-molecular compound.

Advantageous Effects

When the porous carbon material for electrodes of energy storage devices according to the present invention is used in electrodes, durability such as performance retention rate of energy storage devices is improved, the gas generation is inhibited and withstand voltage is improved. The porous carbon material can be preferably used as electrodes for an electric double layer capacitor and a lithium ion capacitor to which high durability is required. In addition, the porous carbon material is preferable as an additive for a positive electrode of a lithium ion battery. Although the mechanism is unclear, it is thought that, in addition to the inhibition of the water adsorption on the porous carbon material, deterioration and decomposition of the electrolytic solution in an energy storage device are inhibited. Moreover, in the porous carbon material for electrodes of energy storage devices according to the present invention, an electric conduction path is formed between the porous carbon materials for electrodes when an electrode is formed from the porous carbon material for electrodes according to the present invention or when an electrode is formed by adding the porous carbon material for electrodes according to the present invention into other materials for a positive electrode. Thus, the porous carbon material according to the present invention is excellent in performance retention rate by inhibiting the resistance increase which is caused by the insulating material being added.

DESCRIPTION OF EMBODIMENTS

Figure 1:
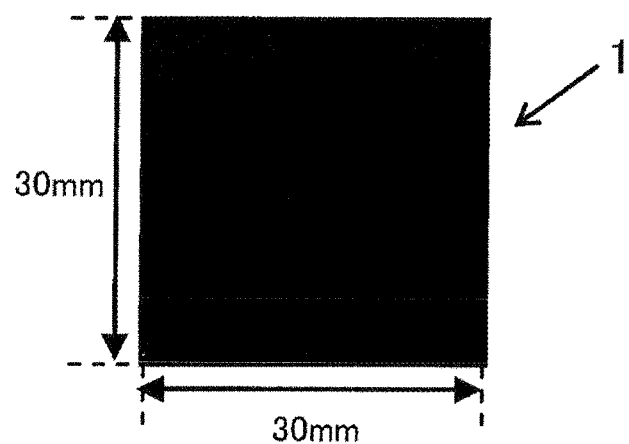
FIG. 1 shows an electrode composition in a sheet form.

The porous carbon material for electrodes of energy storage devices according to the present invention is characterized in that the porous carbon material for electrodes has a BET specific surface area of 1300 to 2050 m$^2$/g, and that the porous carbon material for electrodes comprises a porous carbon material, 0.5 to 5 parts by mass of an insulating material based on 100 parts by mass of the porous carbon material, and 0.25 to 15 parts by mass of a conductive additive based on 100 parts by mass of the insulating material, wherein the insulating material and the conductive additive are carried on the porous carbon material in combination.

The porous carbon material for electrodes of energy storage devices according to the present invention has 1300 to 2050 m$^2$/g, preferably 1320 to 2000 m$^2$/g, more preferably 1400 to 2000 m$^2$/g, even more preferably 1340 to 1950 m$^2$/g, and the most preferably 1500 to 1950 m$^2$/g of a BET specific surface area. When the BET specific surface area is too small, it causes difficulty in the movement of ions in the electrolytic solution, and reduces an electrostatic capacitance per mass. When the BET specific surface area is too large, it causes a decrease in a bulk density of electrodes in which the porous carbon material for electrodes according to the present invention is used, and reduces an electrostatic capacitance per volume.

In this regard, the BET specific surface area is calculated by the use of nitrogen adsorption method, and for example, measured by the process described in Examples.

The porous carbon material for electrodes of energy storage devices according to the present invention comprises a porous carbon material, 0.5 to 5 parts by mass of insulating material based on 100 parts by mass of the porous carbon material, and 0.25 to 15 parts by mass of conductive additive based on 100 parts by mass of the insulating material.

Examples of the porous carbon material, although it is not particularly limited, include charcoal, an activated carbon, a carbon nanotube, a carbon nano horn, a meso-porous carbon which is made by the use of an inorganic porous body as a mold, a carbon aerogel which is produced from an organic wetting gel by the process of drying and carbonizing, or the like. In view of availability and cost, the porous carbon material is preferably an activated carbon. Specific examples of the activated carbon include, for example, an activated carbon derived from plants which is obtained from wood, saw dust, charcoal, shell of fruits such as coconut shell and walnut shell, fruits seed, by-product in a pulp manufacture, lignin, blackstrap molasses, or the like, by carbonization and activation thereof; an activated carbon derived from minerals which is obtained from peat, grass peat, lignite, brown coal, bituminous coal, anthracite, coke, coal tar, coal pitch, petroleum distillation residue, petroleum pitch, or the like, by carbonization and activation thereof; an activated carbon derived from synthetic resins such as phenol, saran, an acrylate resin, or the like, by carbonization and activation thereof; and an activated carbon derived from natural fibers such as regenerated fiber (rayon), cotton, or the like, by carbonization and activation thereof. Examples of the activation process include gas activation in which a hot steam or carbon dioxide gas is used and chemical activation in which chemicals such as phosphoric acid, sulfuric acid, sodium hydroxide or potassium hydroxide is used. Any activation process mentioned above may be used. A single kind of the porous carbon material or a combination of two or more kinds of the porous carbon materials may be used. In view of availability, cost and quality, the activated carbon is preferably derived from coconut shell and more preferably obtained from coconut shell by the use of gas activation.

The porous carbon material is preferably a porous carbon material from which the impurity was removed as much as possible. Examples of the impurity include metal, such as an alkali metal, an alkaline earth metal, nickel, and iron. For example, the porous carbon material from which such an impurity is removed by a washing process with the use of a cleaning liquid such as water or an aqueous solution of inorganic acid (such as hydrochloric acid, sulfuric acid and phosphoric acid) may be used as the porous carbon material in the present invention. In some cases, the porous carbon material contains an impurity (for example, silicon) which cannot be removed by the washing process with the use of an aqueous solution of inorganic acid described above. In this case, a porous carbon material in which the impurity such as silicon is removed by a washing process with the use of an aqueous solution of alkali metal hydroxide such as sodium hydroxide may be used as the porous carbon material in the present invention. The washing process may be carried out in one time by the use of a washing liquid or may be carried out in two or more times with the use of two or more kinds of washing liquids. The washing process may also be carried out with a stirring operation and/or a heating operation. In view of washing efficiency, the washing process is preferably carried out with a stirring operation and/or a heating operation.

In view of obtaining the porous carbon material for electrode according to the present invention which has the BET specific surface area described above, the porous carbon material has preferably 1300 to 2400 m²/g, more preferably 1400 to 2300 m²/g, even more preferably 1420 to 2300 m²/g, even more preferably 1450 to 2200 m²/g, the most preferably 1520 to 2200 m²/g of a BET specific surface area. When the BET specific surface area of the porous carbon material is too small, it causes difficulty in the movement of ions in the electrolytic solution in an energy storage device comprising an electrode which is produced by the use of the porous carbon material for electrodes, and reduces an electrostatic capacitance per mass. When the BET specific surface area of the porous carbon material is too large, it causes a decrease in a bulk density of electrodes in which the porous carbon material for electrodes is used, and reduces an electrostatic capacitance per volume.

The porous carbon material for electrodes according to the present invention comprises 0.5 to 5 parts by mass of an insulating material having a boiling point of 150° C. or more, based on 100 parts by mass of the porous carbon material. Although the insulating material is not particularly limited on the condition that the insulating material has a boiling point of 150° C. or more, has a high breakdown voltage and has a low dielectric loss, examples of the insulating material include hydrorefined mineral oils derived from paraffin or naphthene; hydrocarbon-based synthetic oils such as poly alpha olefin, alkylbenzene, alkyl naphthalene, and alkyl diphenylalkane; oxygenic synthetic oils such as diester, polyol ester, polyoxy alkylene glycol, and polyphenyl ether; silicone oils such as dimethyl silicone, methylphenyl silicone, methyl hydrogen silicone, and annular dimethyl silicone (a siloxane compound having siloxane units in a main chain); fluorocarbon compounds such as perfluoro alkyl ether, perfluoropolyether and hydrochlorofluorocarbon; and esterified compounds such as a rape seed oil esterified with a lower alcohol, etc. Among these compounds, silicone oils (siloxane compounds having siloxane units in a main chain) are preferable in view of that silicone oils have a high dielectric breakdown voltage and are electrochemically stable, and dimethyl silicone is more preferable in view of availability and cost. The porous carbon material for electrode according to the present invention may comprise a single kind of the insulating material or a combination of two or more kinds of the insulating materials as the insulating material.

The porous carbon material for electrodes according to the present invention comprises 0.5 to 5 parts by mass, preferably 0.7 to 4.5 parts by mass, more preferably 1 to 4 parts by mass of an insulating material based on 100 parts by mass of the porous carbon material. When the content of the insulating material is lower than the amount described above, an inhibition of the gas generation due to decomposition of electrolytic solution and improvements in performance retention rate and energetic density are not sufficiently achieved in an energy storage device comprising an electrode which is produced by the use of the porous carbon material for electrodes according to the present invention. When the content of the insulating material is more than 5 parts by mass based on 100 parts by mass of the porous carbon material, on the one hand, the inhibition effect of the gas generation is saturated, and on the other hand, fine pores in the porous carbon material are blocked, and then sometimes, an energy storage ability is reduced.

A kinetic viscosity of the insulating material at 25° C. is preferably 1 to 1000 mm²/s, more preferably 1.5 to 500 mm²/s, even more preferably 2 to 300 mm²/s in view of achieving sufficient effect at lower carried amount of the insulating material by making the insulating material to be thinly and uniformly carried on the porous carbon material, and achieving high energy storage ability. When the kinetic viscosity is too low, the boiling point of the insulating material is relatively decreased, then sometimes, the content of the insulating material is reduced by a volatilization thereof and the effect of the present invention is reduced, depending on the temperature during a drying step in a method for manufacturing the porous carbon material for electrodes according to the present invention or before and after a producing process of electrodes, or during a heating step in a producing process of electrodes with the use of the porous carbon material for electrodes according to the present invention. When the kinetic viscosity is too high, it is difficult for the insulating material to be thinly and uniformly carried on the porous carbon material due to high viscosity, and thus, the amount of the insulating material to be carried which is required to achieve a sufficient effect is sometimes increased. In addition, an energy storage ability is possibly reduced since the pores of the porous carbon material are blocked. The kinetic viscosity is measured at 25° C. based on JIS-K2283 (2000).

The boiling point of the insulating material is more than 150° C., and preferably more than 200° C. When the boiling point of the insulating material is too low, the carried amount of the insulating material is reduced by volatilization thereof and the effect of the present invention is reduced, depending on the temperature during a drying step in a producing process of the porous carbon material for electrodes according to the present invention or before and after a producing process of electrodes, or during a heating step in a producing process of electrodes with the use of the porous carbon material for electrodes according to the present invention. In addition, too low boiling point brings about the possibility of ignition during a heating step or a drying step. The upper value of the boiling point of the insulating material is not limited.

The pour point of the insulating material is preferably −30° C. or less, and more preferably −40° C. or less. When the pour point is too high, an energy storage ability is possibly reduced by the drastic increase in the kinetic viscosity and the solidification of the insulating material under a low temperature condition such as a cold area. A pour-point depressant may be added to control the pour point of the insulating material. The addition of the pour-point depressant reduces an interfacial tension of the insulating material and make the insulating material to be thinly and uniformly carried in the pores of the porous carbon material. Examples of the pour-point depressant to be added are not particularly limited and commonly known additives may be used. Specifically, examples thereof include polyalkyl acrylate, polyvinyl acetate, polyalkyl styrene, polybutene, an ethylene propylene copolymer, polyalkyl methacrylate, a condensate of chlorinated paraffin with naphthaline or phenol. A suitable pour-point depressant may be appropriately selected and used from these pour-point depressants. When the pour-point depressant is added, the content of the pour-point depressant is appropriately selected depending on the kind of the insulating material to which the pour-point depressant is added. In view of achieving the reducing effect of the pour point, the content of the pour-point depressant is preferably 0.01 parts by mass or more based on 100 parts by mass of the insulating material. In view of reducing the effect of blocking the pores of the porous carbon material when the pour-point depressant is added to the porous carbon material, the content is preferably 0.3 parts by mass or less based on 100 parts by mass of the insulating material.

The porous carbon material for electrodes according to the present invention comprises 0.5 to 5 parts by mass of an insulating material which has a boiling point of 150° C. or more based on 100 parts by mass of the porous carbon material, and 0.25 to 15 parts by mass of a conductive additive based on 100 parts by mass of the insulating material. The conductive additive is not particularly limited on the condition that the conductive additive present in the energy storage devices is chemically and electrochemically stable. For example, a particulate or fibrous conductive additive may be used. Examples of the particulate conductive additive include carbon black such as acetylene black and furnace black, natural graphite, artificial graphite, titanium nitride grains, or the like. In addition, surface-modified materials of these particulate conductive additives may be preferably used. In view of availability and cost, the particulate conductive additive is preferably used and carbon black such as acetylene black is more preferably used. Examples of the fibrous conductive additive include carbon fibers such as a vapor grown carbon fiber (VGCF). A single kind of the conductive additive or a combination of two or more kinds of the conductive additives may be used as the conductive additive.

In one embodiment of the present invention in which the particulate conductive additive is used as the conductive additive, the primary particle size of the particulate conductive additive is preferably 20 nm or more, and more preferably 30 nm or more, in view of dispersibility. The primary particle size of the particulate conductive additive is preferably 100 nm or less, and more preferably 50 nm or less, in view of increasing the number of conductive paths so as to increase the inhibiting effect of resistance increase caused by the addition of the insulating material. The primary particle size is an average of the particle size measured by the use of an electronic microscope.

The porous carbon material for electrodes according to the present invention comprises a porous carbon material, an insulating material and a conductive additive. The content of the conductive additive is 0.25 to 15 parts by mass, preferably 0.5 to 12.5 parts by mass, and more preferably 1 to 12.5 parts by mass based on 100 parts by mass of the insulating material. When the content of the conductive additive is lower than the range of the content described above, the inhibiting effect of resistance increase due to the addition of the insulating material is not sufficiently achieved. When the content of the conductive additive is more than the range of the content described above, the inhibiting effect of resistance increase due to the addition of the insulating material is reduced. Although the cause of such a phenomenon is not clearly known, a reduction in dispersibility of the conductive additive is considered as a contributor of the phenomenon.

The porous carbon material for electrodes of energy storage devices according to the present invention comprises a porous carbon material, an insulating material and a conductive additive, in which the insulating material and the conductive additive are carried on the porous carbon material in combination. Since the insulating material and the conductive additive are carried on the porous carbon material in combination, a water adsorption in the porous carbon material which may cause a degradation is inhibited and direct contact of the interfacial surface of the porous carbon material with the electrolytic solution is reduced and the degradation of the energy storage devices is inhibited. In addition, the resistance increase due to the addition of the insulating material is reduced by the conductive additive which is carried on the porous carbon material in combination with the insulating material. Thus, a porous carbon material for electrodes of energy storage devices which is excellent in durability such as a performance retention rate, in which the gas generation is reduced and which can be used at high potential can be obtained.

For example, the mode of the porous carbon material on which the insulating material and the conductive additive are carried in combination is considered as the following modes: a mode in which the insulating material and the conductive additive are present as a mixture on the surface of the porous carbon material; and a mode in which the conductive additive is embedded or dispersed in the insulating material being spread on the surface of the porous carbon material.

The porous carbon material for electrodes of energy storage devices according to the present invention may be produced by a process in which 0.5 to 5 parts by mass of an insulating material based on 100 parts by mass of the porous carbon material and 0.25 to 15 parts by mass of a conductive additive based on 100 parts by mass of the insulating material are carried on the porous carbon material. The carried amount of the insulating material is preferably 0.7 to 4.5 parts by mass, and more preferably 1 to 4 parts by mass based on 100 parts by mass of the porous carbon material. The carried amount of the conductive additive is preferably 0.5 to 12.5 parts by mass, and more preferably 1 to 12.5 parts by mass based on 100 parts by mass of the porous carbon material.

The process to make the insulating material and the conductive additive to be carried on the porous carbon material is not particularly limited. For example, a process in which the insulating material and the conductive additive are added to the porous carbon material at the same time, a process in which a mixture comprising the insulating material and the conductive additive is added to the porous carbon material, or a process in which the porous carbon material is dipped in a mixture comprising the insulating material and the conductive additive may be conducted. For example, the following processes using an impregnating neat liquid or an impregnating solution may be conducted.

(1) A process in which an impregnating neat liquid of the insulating material or an impregnating solution, obtained by diluting the insulating material with a solvent and the conductive additive are added to the porous carbon material at the same time by the use of a spraying method, a blowing method or the like, or are added to the porous carbon material and then they are stirred and mixed.

(2) A process in which a mixture (an impregnating neat liquid) is prepared in advance by mixing the insulating material and the conductive additive, and the mixture is splayed onto the porous carbon material or the mixture is added to the porous carbon material and then they are stirred and mixed.

(3) A process in which an impregnating neat liquid of the insulating material or an impregnating solution obtained by diluting the insulating material with a solvent and an impregnating solution obtained by diluting the conductive additive with a solvent are added to the porous carbon material at the same time by the use of a spraying method or the like, or are added to the porous carbon material and then they are stirred and mixed, or a process in which the porous carbon material is dipped in a mixture comprising an impregnating solution obtained by diluting a certain amount of the insulating material with a solvent and an impregnating solution obtained by diluting a certain amount of the conductive additive with a solvent. The solvent may be dried if necessary.

(4) A process in which an impregnating solution, which is obtained by mixing the insulating material, the conductive additive and a solvent in advance, is added to the porous carbon material by the use of a spraying method, or is added to the porous carbon material and then they are stirred and mixed, or the porous carbon material is dipped in the impregnating solution. The solvent may be dried if necessary.

When a spraying method is used to add the impregnating neat liquid or the impregnating solution to the porous carbon material, a spray can be used as a splaying equipment. When the conductive additive is in powder form, the conductive additive may be added to the porous carbon material by a blowing method. As a blowing equipment, for example, a powder coating apparatus comprising an air blast/an air splay, an electrostatic coating apparatus may be used. Furthermore, the spraying step or the blowing step may be carried out with rotating the porous carbon material in a mixing/stirring apparatus such as a double cone mixer, a horizontal cylindrical mixer, a rocking rotating mixer, a concrete mixer or the like. Otherwise, the spraying step or the blowing step may be carried out in a grinders such as a ball mill, a bead mill, a jet mill, or the like. It is also possible to conduct the spraying step or the blowing step in an apparatus such as a rotary kiln which is capable of stirring and heating and then to conduct a drying step. When a dipping step using the impregnating neat liquid or the impregnating solution is conducted, the porous carbon material is added and dipped in the impregnating neat liquid or the impregnating solution, then a solid material may be separated and dried if necessary. In view of workability and coexistence rate of the insulating material with the conductive additive, the processes (2) and (4) described above are preferably carried out.

The porous carbon material for electrodes of energy storage devices according to the present invention can be produced by adding the impregnating neat liquid consisting of the insulating material and the conductive additive to the porous carbon material to be carried on the porous carbon material. It is also possible that the neat liquid diluted by being mixed with a solvent or a solvent comprising a high-molecular compound described below is added to the porous carbon material so that the insulating material and the conductive additive are carried on the porous carbon material.

When a mixture obtained by mixing the insulating material with the conductive additive in advance is used, it is preferable that the insulating material and the conductive additive are uniformly dispersed in the mixture at a certain level since the insulating material and the conductive additive can be uniformly carried on the porous carbon material even if the carried amount of the components is low. For example, a process in which an emulsion mixture is used, a process in which a high-molecular compound described below is added to the mixture, or the like, may be used so as to achieve uniform dispersion. Furthermore, dispersibility can be increased by preparing the mixture shortly before adding or spraying them to the porous carbon material or by stirring the mixture again shortly before adding or spraying them to the porous carbon material.

When the impregnating solution obtained by diluting the impregnating neat liquid of the insulating material and/or the conductive additive is used for making the insulating material and the conductive additive to be carried on the porous carbon material at the same time, the solvent is preferably a solvent which can be removed during a drying step preferably at 100 to 330° C. Examples of such a solvent include, for example, water, alcohols such as ethanol, methanol, propanol and butanol, acetone, methyl ethyl ketone, methyl isobutyl ketone, benzene, toluene, xylene, cyclohexane, etc. A single kind of the solvent or a combination of two or more kinds of the solvents may be used as the solvent. Among these, water is preferably used in view of the safeness in the earth environment and in manufacturing.

The process for dispersing the conductive additive in the insulating material comprised in the impregnating neat liquid or the impregnating solution is not particularly limited as long as the conductive additive can be dispersed. Various dispersing devices may be used. Examples of the dispersing device include a high speed mixer agitating with the impeller rotating at a high speed, a roll mill kneading an object between two or three rollers, a beads mill and a ball mill which achieve the effect by the impact produced by moving hard balls in the container, a high speed shearing mixer which can pulverize and disperse an object simultaneously, a high-pressure injection mixer which attains distribution and emulsification of the objective suspension by applying high pressure to the suspension to generate a droplet impingement, a ultrasonic emulsifying disperser using a supersonic wave, etc.

These machines may be preferably used for dispersing and mixing the insulating material with the conductive additive, and for dispersing and mixing the insulating material and/or the conductive additive with the solvent and others. A single kind of machine or two or more kinds of machines can be used.

A high-molecular compound may be added so as to disperse the insulating material and/or the conductive additive in the solvent such as water. The high-molecular compound is not particularly limited as long as the compound present in the energy storage devices is chemically and electrochemically stable and the compound increases the dispersibility of the insulating material and the conductive additive or the compound has a thickening effect. Examples of the high-molecular compound include a cellulose derivative (a sodium or ammonium salt of carboxymethylcellulose (CMC)), polyacrylic acid and polyacrylate, polyethylene oxide and its derivative, etc. A single kind of the compound or a combination of two or more kinds of the compounds may be used as the high-molecular compound. Carboxymethylcellulose is preferable as the high-molecular compound since it is a time-proven material for electrodes. The content of the high-molecular compound varies depending on the kind of the high-molecular compound to be used and is not particularly limited. In view of influence on the pores of the porous carbon material such as an activated carbon, the content of the high-molecular compound is, as a solid content, preferably less than 5 parts by mass and more preferably less than 2 parts by mass based on 100 parts by mass of the porous carbon material.

In one embodiment of the present invention using the high-molecular compound, the high-molecular compound may be further carried in combination in the porous carbon material for electrodes of energy storage devices according to the present invention. In this regard, it is preferable that the high-molecular compound is not carried on the porous carbon material since the high-molecular compound is an additive which does not contribute the electric storage capacity. However, in view of increasing or maintaining the dispersibility of the conductive additive, the high-molecular compound may be carried on the porous carbon material in combination. The content of the high-molecular compound in the porous carbon material for electrodes of energy storage devices according to the present invention is, as a solid content, preferably less than 5 parts by mass and more preferably less than 2 parts by mass based on 100 parts by mass of the porous carbon material in view of influence on the pores of the porous carbon material such as an activated carbon.

The porous carbon material for electrodes of energy storage devices according to the present invention can be prepared by a process in which the insulating material and the conductive additive are carried on the porous carbon material and then the porous carbon material is dried. The drying step is conducted so as to remove water or the solvent, which is used for diluting the impregnating neat liquid, adsorbed in the porous carbon material. For example, water or the solvent which is used for diluting the impregnating neat liquid adsorbed in the porous carbon material is removed by heating the porous carbon material. In addition to or in replace of the heating, the drying step may be conducted by other means such as pressure reduction, pressure reduction and heating and freezing so as to remove water or the solvent used for diluting the impregnating neat liquid adsorbed in the porous carbon material.

The drying step is conducted by heating at a temperature of preferably 100 to 330° C. preferably for 0.1 to 24 hours.

The heating temperature is preferably 100° C. or more, more preferably 110° C. or more and even more preferably 120° C. or more in view of removing the water adsorbed in the porous carbon material. The heating temperature is preferably 330° C. or less, more preferably 300° C. or less and even more preferably 250° C. or less in view of preventing the decomposition and volatilization of the insulating material by heating.

Although the drying time may vary depending on the drying temperature, the drying time is preferably 0.1 hour or more, more preferably 0.5 hour or more and even more preferably 1 hour or more in view of removing the water adsorbed in the porous carbon material. The drying time is preferably 24 hours or less, more preferably 12 hours or less and even more preferably 6 hours or less in view of economics.

The drying step may be carried out at normal pressure or reduced pressure. When the drying step is carried out at normal pressure, the step is preferably conducted under an inert gas (such as nitrogen gas or argon gas) atmosphere or under an air atmosphere which has a temperature of dew point—20° C. or less.

The porous carbon material for electrodes of energy storage devices according to the present invention prevents the water adsorption or the decomposition of the electrolytic solution, reduces the gas generation amount, and achieves excellent effect in performance retention rate and withstand voltage. Therefore, the porous carbon material for electrodes according to the present invention can be preferably used as electrodes for an electric double layer capacitor and a lithium ion capacitor to which high durability is required. When the porous carbon material for electrodes according to the present invention is used in an electrode, for example, the porous carbon material for electrodes according to the present invention is pulverized to have a suitable central particle size, the pulverized porous carbon material for electrodes is mixed with a binder and further conductive additives if necessary, and then, the resulting mixture is shaped to produce an electrode. In addition, for example, the porous carbon material for electrodes according to the present invention may be used as an additive for a positive electrode in a lithium ion battery. When the porous carbon material for electrode according to the present invention is used as an additive in the electrode, the porous carbon material is pulverized to have a suitable central particle size, the pulverized porous carbon material for electrodes is added to the materials composing of the lithium ion battery and mixed with them, and is shaped to produce a positive electrode.

EXAMPLES

The present invention will be further explained based on the Examples below, but is not limited by the following Examples. Each measured value of physical property shown in Examples and Comparative Examples is measured by the following processes.

(Specific Surface Measurement)

Nitrogen adsorption isotherm of activated carbon and carbon material was measured at 77K with the use of BELSORP-mini made by BEL-Japan company after heating the activated carbon or the carbon material at 120° C. for 3 hours under nitrogen flow (nitrogen flow rate: 50 mL/min). The obtained nitrogen adsorption isotherm was analyzed using a multi-point BET method and the specific surface is calculated from a straight line in a region in which $p/p_0$ is 0.01 to 0.1 on the obtained curve.

(Kinetic Viscosity Measurement)

The kinetic viscosity was measured at 25° C. according to JIS K2283 (2000). A Ubbelohde viscometer was used as a measuring device.

(Preparation of Electrode to be Tested)

A porous carbon material for electrodes, a binder and a conductive additive which compose an electrode were used after preliminary vacuum drying at 120° C. under reduced pressure (0.1 KPa or less) for 16 hours or more. The porous carbon material for electrodes, the conductive additive and the binder were weighed in the ratio of (the mass of porous carbon material and insulating material comprised in porous carbon material for electrodes):(the mass of conductive additive comprised in porous carbon material for electrodes+the mass of conductive additive added for producing the electrode):mass of binder to be 81:9:10 and were kneaded. Polytetrafluoroethylene "6J" made by Du Pont-Mitsui company was used as the binder. Conductive carbon black "denka black granules" manufactured by Denki Kagaku Kogyo Co., Ltd. was used as the conductive additive. After kneading them, the mixture was cut into flaky shape having 1 mm or lower square in size, was pressurized at 400 Kg/cm$^2$ with the use of a coin shaping machine to obtain a secondary molded material in a coin form. The secondary molded material is shaped with the use of a roll press machine into a sheet form having a thickness of 160 μm±5%, then the sheet was cut in a certain size (3 cm square) and the electrode composition 1 as shown in FIG. 1 was produced. After drying the resulting electrode composition 1 at 120° C., under reduced pressure for 16 hours or more, the weight, the thickness of the sheet and the dimension were measured. Then, the electrode was used in the following measurement. The production process of the porous carbon material for electrodes is described below regarding each of Examples and Comparative Examples. Table 1 shows each formulation of porous materials for electrodes.

(Preparation of Electrode Cell to be Measured)

Figure 2:
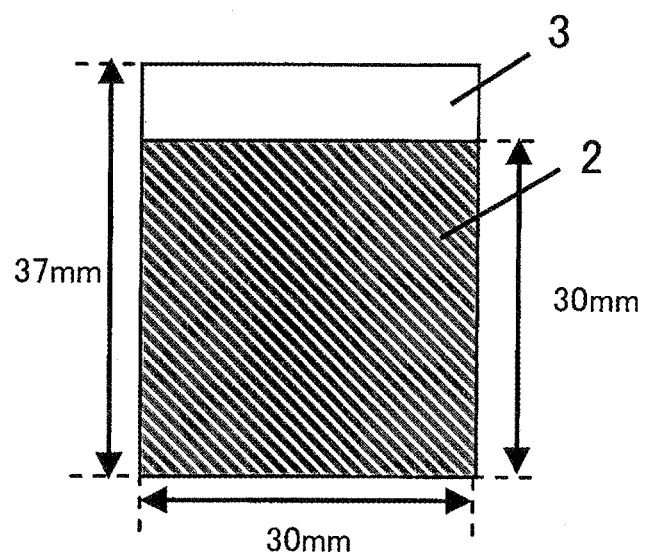
FIG. 2 shows that an electrically conductive adhesive is coated on a current collector (etching aluminum foil).
Figure 3:
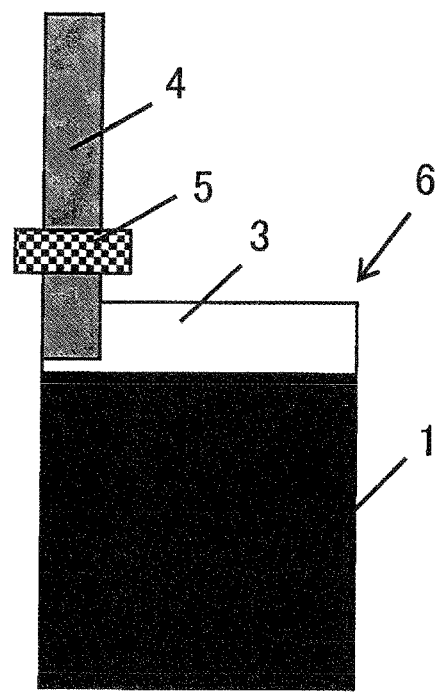
FIG. 3 shows a polarized electrode, in which an electrode composition in a sheet form is bonded to a current collector, and an aluminum tab is welded thereto by the use of ultrasonic weld.

As shown in FIG. 2, the electrically conductive adhesive 2 "HITASOL GA-703" manufactured by Hitachi Chemical Co., Ltd. was applied to the etching aluminum foil 3 obtained from Hohsen Corp. so that spreading thickness is set to 100 μm. Then, as shown in FIG. 3, the etching aluminum foil 3, to which the electrically conductive adhesive 2 was applied, was bonded with the electrode composition 1 in a shape form which was preliminary cut. The tub 4 having an aluminum-made sealant 5 obtained from Hohsen Corp. was welded to the etching aluminum foil 3 with the use of an ultrasonic welding machine. After welding, it was vacuum dried at 120° C. to obtain polarized electrode 6 having an aluminum current collector.

Figure 4:
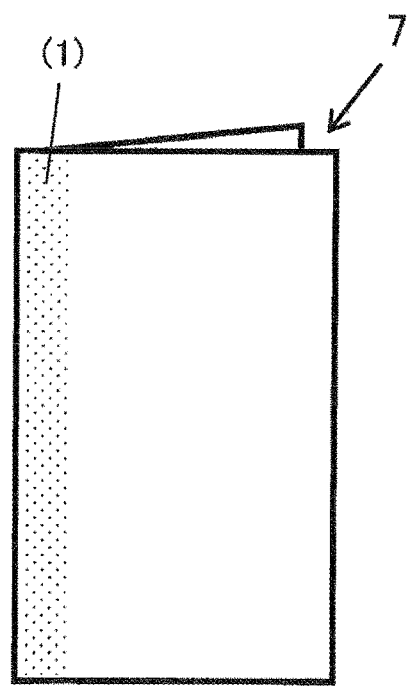
FIG. 4 shows a bursiform outer package sheet.
Figure 5:
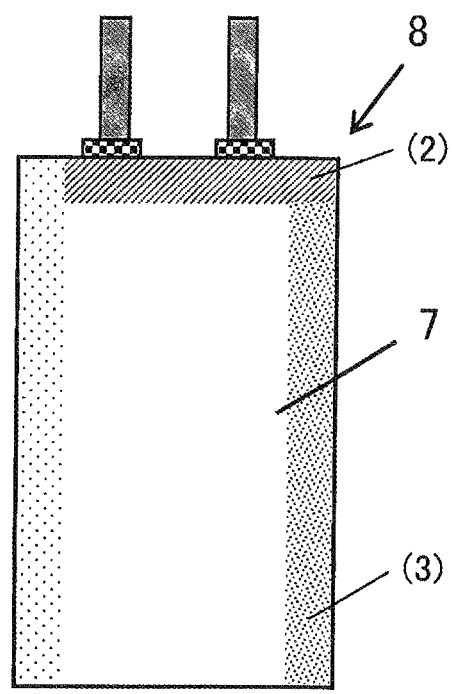
FIG. 5 shows an electric double layer capacitor.

As shown in FIG. 4, an aluminum laminated resin sheet manufactured by Hohsen Corp. was cut in rectangle (200 mm by 60 mm), was half folded and was thermo-compressed at one side ((1) shown in FIG. 4) to obtain a bursiform outer package sheet 7 in which the remaining two sides were opened. A laminate was prepared by laminating two pieces of the polarized electrode 6 via a separator "TF-40" (not shown in Figure) manufactured by Nippon Kodoshi Corporation and made of cellulose. The laminate was inserted in outer package sheet 7. One side with which tub 4 contacts ((2) in FIG. 5) was thermo-compressed to fix polarized electrode 6. Then, after being vacuum dried at 120° C. under reduced pressure for 16 hours, the obtained sample was filled with an electrolytic solution in a dry box under an argon atmosphere (dew point—90° C. or less). A propylene carbonate solution comprising 1.5 mol/L of triethylmethyl ammonium•tetrafluoroborate manufactured by Toyo Gosei Co., Ltd. was used as the electrolytic solution. After immersing the laminate in the electrolytic solution in outer package sheet 7, the remaining one side ((3) in FIG. 5) was thermo-compressed to produce electric double layer capacitor 8 shown in FIG. 5.

(Electrostatic Capacitance Measurement)

The resulting electric double layer capacitor 8 was charged at constant current of 200 mA per electrode surface area, at 25° C. or −30° C., to arrive at 3.0 V with the use of "CAPACITOR TESTER PFX2411" manufactured by Kikusui Electronics Corporation. Then, it was auxiliary charged at 3.0 V for 30 minutes under constant voltage. After the auxiliary charging, it was discharged at 25 mA. From the obtained discharge curve data, electrostatic capacitance (F) was calculated with the use of an energy conversion method. Specifically, the electrostatic capacitance (F) was calculated from the discharge energy which was discharged when discharging was carried out after charging until the voltage becomes zero. Then, the electrostatic capacitance (F/cc) was calculated by dividing the obtained electrostatic capacitance with the volume of the electrode. The result is shown in Table 2.

(Durability Test)

The durability test was conducted as follows: after measuring the electrostatic capacitance described above, the capacitor was kept for 400 hours in a thermostatic tank at 60° C. with applying a voltage of 3.0 V. Then, the electrostatic capacitance was measured at 25° C. and −30° C. in the same manner described above. By comparing the electrostatic capacitances obtained before and after the endurance test, the capacity retention rate was calculated for each temperature according to the following formula (1). The result obtained by a measurement before keeping for 400 hours in the thermostatic tank at 60° C. is described as a result measured before the endurance test, and the result obtained by a measurement after keeping for 400 hours is described as a result measured after the endurance test. The result is shown in Table 2.

[Formula 1]

$$\text{Capacity Retention Rate (\%)} = \frac{\text{Electrostatic Capacitance per Volume measured after Endurance Test}}{\text{Electrostatic Capacitance per Volume measured before Endurance Test}} * 100 \quad (1)$$

(Resistance Measurement)

The resistance was measured with the use of a electrochemical measurement device (VSP manufactured by Bio-Logic Corporation), according to a constant-voltage AC impedance measuring method, at 25° C. and −30° C., with applying amplitude vibration of 5 mV on a center 0V, at a frequency from 4 mHz to 1 MHz. As a result, Bode-Plot (FIG. 6) showing a relation between frequency and impedance was obtained. The difference in resistance value between 1 Hz and 1000 Hz is calculated as a resistance relating to charge transfer (reaction in electrode and charge and discharge of ions) and the obtained resistance values were compared with each other. The result is shown in Table 3.

(Measurement of Gas Generation Amount)

The gas generation amount was measured as follows: the dry weight of the electrode cell and the weight of the electrode cell in water were measured; the cell volume was calculated from the observed buoyance and the density of water, then the gas amount in volume is calculated from the change in cell volume before and after the endurance test with a revision of the temperature difference at measurement. That is, the gas generation amount was calculated according to the following formula (2). In formula (2), cell weight A represents the cell weight (g) in air and cell weight W represents the cell weight (g) in water.

[Formula 2]

$$\text{Gas Generation Amount (cc)} = \frac{\begin{array}{c}(\text{Cell Weight } A \text{ after Endurance Test} - \\ \text{Cell Weight } W \text{ after Endurance Test}) - \\ (\text{Cell Weight } A \text{ before Endurance Test} - \\ \text{Cell Weight } W \text{ before Endurance Test})\end{array}}{\frac{\left(273 + \text{Temperature in Measurement after Endurance Test (° C.)}\right)}{\left(273 + \text{Temperature in Measurement after Endurance Test (° C.)}\right)}} \quad (2)$$

A gas generation amount per mass of the activated carbon (cc/g) was calculated by dividing the gas generation amount measured as described above with the weight of the activated carbon composing the electrode composition. The result is shown in Table 2.

Example 1

2.00 parts by mass of dimethyl silicone oil "KF-96-100CS" which is one of a siloxane compound (manufactured by Shin-Etsu Chemical Co., Ltd., Boiling point: 200° C. or more, volatile matter content at 150° C./24 h: 0.5 or less, kinetic viscosity: 100 mm$^2$/s) was mixed with 0.02 parts by mass (corresponding to 1 part by mass based on 100 parts by mass of the insulating material) of denka black (manufactured by Denki Kagaku Kogyo Co., Ltd.) and they were stirred by the use of Thin-Film Spin System High-Speed Mixer "FILMIX® model 40-40" (manufactured by PRIMIX company). Furthermore, the mixture was uniformly dispersed by applying supersonic vibration for 1 hour to prepare a impregnating solution.

The resulting impregnating solution was sprayed with the use of a splaying apparatus to 100 parts by mass of activated carbon granules from coconut shell manufactured by Kuraray Chemical Co., Ltd. (BET specific surface area: 1630 m$^2$/g, particle size: 98 weight % or more of activated carbon particles pass through a sieve of 10 mesh but not a sieve of 60 mesh; ignition residue: 0.17%). The resulting carbon material was dried at 120° C. for 16 hours to obtain 102.02 parts by mass of a porous carbon material for electrodes. Each kind of physical property was measured by using the obtained porous carbon material for electrodes.

The obtained porous carbon material for electrodes was finely pulverized to have a central particle size of 6 μm, electrode composition 1 was prepared according to the process for preparing an electrode described above. By using the electrode composition 1, polarized electrode 6 and electric double layer capacitor 8 were prepared according to the process for preparing the electrode cell to be measured described above. Each measurement was conducted with using the obtained electric double layer capacitor 8. Measured physical values of the porous material for electrode and the result of measurement for the electric double layer capacitor are shown in Tables 1-3.

Example 2

2.00 parts by mass of dimethyl silicone oil "KF-96-100CS" was mixed with 0.02 parts by mass (corresponding to 1 part by mass based on 100 parts by mass of the insulating material) of denka black and 0.50 parts by mass of aqueous solution comprising 2 mass of CMC "serogen 7A" (manufactured by DKS Co., Ltd.) and they are stirred by the use of Thin-Film Spin System High-Speed Mixer "FILMIX® model 40-40". Then, the resulting solution was mixed with ion-exchanged water so that the total amount is 30.00 parts by mass, and stirred to prepare a impregnating solution. The resulting impregnating solution was splayed to 100 parts by mass of activated carbon granules from coconut shell in the same manner as described in Example 1. Then, the resulting carbon material was vacuum dried at 120° C. under reduced pressure for 16 hours to obtain 102.03 parts by mass of porous carbon material for electrodes. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 3

1.50 parts by mass of dimethyl silicone oil "KF-96-100CS" was mixed with 1.79 parts by mass of an emulsion of dimethyl silicone oil (kinetic viscosity 100 mm²/s) "Softnersil-10" (manufactured by Shin-Etsu Chemical Co., Ltd.; describing that non-volatile content is 30% in which mixture is 2%) and 0.02 parts by mass (corresponding to 1 part by mass based on 100 parts by mass of the insulating material) of denka black, and they are stirred by the use of Thin-Film Spin System High-Speed Mixer "FILMIX® model 40-40". Then, the resulting solution was mixed with ion-exchanged water so that the total amount is 40.00 parts by mass, and stirred to prepare an emulsified solution. The resulting solution was splayed to 100 parts by mass of activated carbon granules from coconut shell in the same manner as described in Example 1. Then, the resulting carbon material was dried at 120° C. for 16 hours to obtain 102.06 parts by mass of porous carbon material for electrodes. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 4

A porous carbon material for electrodes was prepared in the same manner as described in Example 2 other than that the amount of dimethyl silicone oil was changed to 1.00 part by mass (the amount of the conductive additive corresponds to 2 parts by mass based on 100 parts by mass of the insulating material). In Example 4, the amount of the porous carbon material for electrodes after splaying and drying was 101.03 parts by mass. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 5

A porous carbon material for electrodes was prepared in the same manner as described in Example 2 other than that the amount of dimethyl silicone oil was changed to 3.00 parts by mass (the amount of the conductive additive corresponds to 0.67 parts by mass based on 100 parts by mass of the insulating material). In Example 5, the amount of the porous carbon material for electrodes after splaying and drying was 103.03 parts by mass. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 6

A porous carbon material for electrodes was prepared in the same manner as described in Example 2 other than that the amount of dimethyl silicone oil was changed to 5.00 parts by mass (the amount of the conductive additive corresponds to 0.40 parts by mass based on 100 parts by mass of the insulating material). In Example 6, the amount of the porous carbon material for electrodes after splaying and drying was 105.03 parts by mass. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 7

A porous carbon material for electrodes was prepared in the same manner as described in Example 1 other than that dimethyl silicone oil "KF96-100CS" was changed to "KF96L-2CS" (boiling point: 230° C., kinetic viscosity: 2 mm²/s.) In Example 7, the amount of the porous carbon material for electrodes after splaying and drying was 102.02 parts by mass. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 8

A porous carbon material for electrodes was prepared in the same manner as described in Example 1 other than that dimethyl silicone oil "KF-96-100CS" was changed to "KF-96-50CS" (boiling point: 200° C. or more, volatile matter content at 150° C./24 h: 0.5 or less, kinetic viscosity: 50 mm$^2$/s). In Example 8, the amount of the porous carbon material for electrodes after splaying and drying was 102.06 parts by mass. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 9

A porous carbon material for electrodes was prepared in the same manner as described in Example 1 other than that dimethyl silicone oil "KF-96-100CS" was changed to "KF-96-1000CS" (boiling point: 200° C. or more, volatile content at 150° C./24 h: 0.5 or less, kinetic viscosity: 1000 mm$^2$/s). In Example 9, the amount of the porous carbon material for electrodes after splaying and drying was 102.02 parts by mass. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 10

A porous carbon material for electrodes was prepared in the same manner as described in Example 2 other than that the amount of denka black was changed to 0.05 parts by mass (the amount corresponds to 2.5 parts by mass based on 100 parts by mass of the insulating material). In Example 10, the amount of the porous carbon material for electrodes after splaying and drying was 102.06 parts by mass. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 11

A porous carbon material for electrodes was prepared in the same manner as described in Example 2 other than that the amount of denka black was changed to 0.20 parts by mass (the amount corresponds to 10 parts by mass based on 100 parts by mass of the insulating material). In Example 11, the amount of the porous carbon material for electrodes after splaying and drying was 102.21 parts by mass. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 12

A porous carbon material for electrodes was prepared in the same manner as described in Example 1 other than that the activated carbon granules from coconut shell manufactured by Kuraray Chemical Co., Ltd. was changed to that having a BET specific surface area of 1450 m$^2$/g. In Example 12, the amount of the porous carbon material for electrodes after splaying and drying was 102.02 parts by mass. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 13

A porous carbon material for electrodes was prepared in the same manner as described in Example 1 other than that the activated carbon granules from coconut shell manufactured by Kuraray Chemical Co., Ltd. were changed to that having a BET specific surface area of 1862 m$^2$/g. In Example 13, the amount of the porous carbon material for electrodes after splaying and drying was 102.02 parts by mass. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 14

A porous carbon material for electrodes was prepared in the same manner as described in Example 1 other than that the activated carbon granules from coconut shell manufactured by Kuraray Chemical Co., Ltd. were changed to that having a BET specific surface area of 2069 m$^2$/g. In Example 14, the amount of the porous carbon material for electrodes after splaying and drying was 102.02 parts by mass. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Example 15

A porous carbon material for electrodes and polarized electrode 6 were prepared in the same manner as described in Example 2. Then, electrode composition 1, polarized electrode 6 and electric double layer capacitor 8 were prepared in the same manner as described in Example 1 other than that an acetonitrile solution comprising 1.0 mol/L of tetraethyl ammonium•tetrafluoroborate "LIPASTE-AN/EAF1" manufactured by Tomiyama Pure Chemical Industries, Ltd. was used as the electrolytic solution instead of the propylene carbonate solution comprising 1.5 mol/L of triethylmethyl ammonium•tetrafluoroborate. Each Measurement was conducted in the same manner as described in Example 1. The results are shown in Tables 1-3.

Example 16

A porous carbon material for electrodes and polarized electrode 6 were prepared in the same manner as described in Example 11. Then, electrode composition 1, polarized electrode 6 and electric double layer capacitor 8 were prepared in the same manner as described in Example 1 other than that an acetonitrile solution comprising 1.0 mol/L of tetraethyl ammonium/tetrafluoroborate "LIPASTE-AN/EAF1" manufactured by Tomiyama Pure Chemical Industries, Ltd. was used as the electrolytic solution instead of the propylene carbonate solution comprising 1.5 mol/L of triethylmethyl ammonium•tetrafluoroborate. Each Measurement was conducted in the same manner as described in Example 1. The results are shown in Tables 1-3.

Reference Example 1

Electrode composition 1, polarized electrode 6 and electric double layer capacitor 8 were prepared in the same manner as described in Example 1 other than that the pulverized activated carbon granules from coconut shell manufactured by Kuraray Chemical Co., Ltd. were directly used without splaying the impregnating solution thereto. Each Measurement was conducted in the same manner as described in Example 1. The results are shown in Tables 1-3.

Reference Example 2

Electrode composition 1, polarized electrode 6 and electric double layer capacitor 8 were prepared in the same manner as described in Example 1 other than that the activated carbon granules from coconut shell manufactured by Kuraray Chemical Co., Ltd. were changed to that having a BET specific surface area of 1290 $m^2/g$, and the pulverized activated carbon granules from coconut shell were directly used without splaying the impregnating solution thereto. Each Measurement was conducted in the same manner as described in Example 1. The results are shown in Tables 1-3.

Reference Example 3

Electrode composition 1, polarized electrode 6 and electric double layer capacitor 8 were prepared in the same manner as described in Example 1 other than that the activated carbon granules from coconut shell manufactured by Kuraray Chemical Co., Ltd. were changed to that having a BET specific surface area of 1450 $m^2/g$, and the pulverized activated carbon granules from coconut shell were directly used without splaying the impregnating solution thereto. Each Measurement was conducted in the same manner as described in Example 1. The results are shown in Tables 1-3.

Reference Example 4

Electrode composition 1, polarized electrode 6 and electric double layer capacitor 8 were prepared in the same manner as described in Example 1 other than that the activated carbon granules from coconut shell manufactured by Kuraray Chemical Co., Ltd. were changed to that having a BET specific surface area of 1862 $m^2/g$, and the pulverized activated carbon granules from coconut shell were directly used without splaying the impregnating solution thereto. Each Measurement was conducted in the same manner as described in Example 1. The results are shown in Tables 1-3.

Reference Example 5

Electrode composition 1, polarized electrode 6 and electric double layer capacitor 8 were prepared in the same manner as described in Example 1 other than that the activated carbon granules from coconut shell manufactured by Kuraray Chemical Co., Ltd. were changed to that having a BET specific surface area of 2069 $m^2/g$, and the pulverized activated carbon granules from coconut shell were directly used without splaying the impregnating solution thereto. Each Measurement was conducted in the same manner as described in Example 1. The results are shown in Tables 1-3.

Reference Example 6

Electrode composition 1, polarized electrode 6 and electric double layer capacitor 8 were prepared in the same manner as described in Example 1 other than that the activated carbon granules from coconut shell manufactured by Kuraray Chemical Co., Ltd. were changed to that having a BET specific surface area of 2224 $m^2/g$, and the pulverized activated carbon granules from coconut shell were directly used without splaying the impregnating solution thereto. Each Measurement was conducted in the same manner as described in Example 1. The results are shown in Tables 1-3.

Reference Example 7

Electrode composition 1 and polarized electrode 6 were prepared in the same manner as described in Reference Example 1. Then, an electric double layer capacitor 8 was prepared in the same manner as described in Example 1 other than that an acetonitrile solution comprising 1.0 mol/L of tetraethyl ammonium•tetrafluoroborate "LIPASTE-AN/EAF1" manufactured by Tomiyama Pure Chemical Industries, Ltd. was used as the electrolytic solution instead of the propylene carbonate solution comprising 1.5 mol/L of triethylmethyl ammonium•tetrafluoroborate. Each Measurement was conducted in the same manner as described in Example 1. The results are shown in Tables 1-3.

Comparative Example 1

A porous carbon material for electrodes was prepared in the same manner as described in Example 1 other than that denka black was removed. In Comparative Example 1, the amount of the porous carbon material for electrodes after splaying and drying was 102.00 parts by mass. The obtained porous carbon material for electrodes was finely pulverized to have a central particle size of 6 μm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Comparative Example 2

A porous carbon material for electrodes was prepared in the same manner as described in Example 2 other than that the amount of dimethyl silicone oil "KF-96-100CS" was changed to 0.30 parts by mass (the amount of the conductive additive corresponds to 6.67 parts by mass based on 100 parts by mass of the insulating material). In Comparative Example 2, the amount of the porous carbon material for electrodes after splaying and drying was 100.33 parts by mass. The obtained porous carbon material for electrodes was finely pulverized to have a central particle size of 6 µm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Comparative Example 3

A porous carbon material for electrodes was prepared in the same manner as described in Example 2 other than that the amount of dimethyl silicone oil was changed to 7.00 parts by mass (the amount of the conductive additive corresponds to 0.29 parts by mass based on 100 parts by mass of the insulating material). In Comparative Example 3, the amount of the porous carbon material for electrodes after splaying and drying was 107.03 parts by mass. The obtained porous carbon material for electrodes was finely pulverized to have a central particle size of 6 µm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Comparative Example 4

A porous carbon material for electrodes was prepared in the same manner as described in Example 1 other than that dimethyl silicone oil "KF-96-100CS" was changed to "KF-96L-0.65CS" (boiling point: 100° C., kinetic viscosity: 0.65 mm$^2$/s). In Comparative Example 3, the amount of the porous carbon material for electrodes after splaying and drying was 100.42 parts by mass. The obtained porous carbon material for electrodes was finely pulverized to have a central particle size of 6 µm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Comparative Example 5

A porous carbon material for electrodes was prepared in the same manner as described in Example 2 other than that the amount of denka black was changed to 0.002 parts by mass (the amount corresponds to 0.1 parts by mass based on 100 parts by mass of the insulating material). In Comparative Example 5, the amount of the porous carbon material for electrodes after splaying and drying was 102.012 parts by mass. The obtained porous carbon material for electrodes was finely pulverized to have a central particle size of 6 µm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Comparative Example 6

A porous carbon material for electrodes was prepared in the same manner as described in Example 2 other than that the amount of denka black was changed to 0.40 parts by mass (the amount corresponds to 20 parts by mass based on 100 parts by mass of the insulating material). In Comparative Example 6, the amount of the porous carbon material for electrodes after splaying and drying was 102.41 parts by mass. The obtained porous carbon material for electrodes was finely pulverized to have a central particle size of 6 µm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Comparative Example 7

A porous carbon material for electrodes was prepared in the same manner as described in Example 1 other than that the activated carbon granules from coconut shell manufactured by Kuraray Chemical Co., Ltd. were changed to that having a BET specific surface area of 2224 m$^2$/g. In Comparative Example 7, the amount of the porous carbon material for electrodes after splaying and drying was 102.02 parts by mass. The obtained porous carbon material for electrodes was finely pulverized to have a central particle size of 6 µm, then, electrode composition 1, polarized electrode 6 and electric double layer capacitor 8 were prepared in the same manner as described in Example 1. Each Measurement was conducted in the same manner as described in Example 1. The results are shown in Tables 1-3.

Comparative Example 8

A porous carbon material for electrodes, electrode composition 1 and polarized electrode 6 were prepared in the same manner as described in Example 2 other than that denka black was removed. Then, an electric double layer capacitor 8 was prepared in the same manner as described in Example 1 other than that an acetonitrile solution comprising 1.0 mol/L of tetraethyl ammonium tetrafluoroborate "LIPASTE-AN/EAF1" manufactured by Tomiyama Pure Chemical Industries, Ltd. was used as the electrolytic solution. Each Measurement was conducted in the same manner as described in Example 1. The results are shown in Tables 1-3.

TABLE 1

| | porous carbon material for electrodes | | | | | |
|---|---|---|---|---|---|---|
| | | formulation | | | | |
| | porous | insulating material | | | conductive additive | | |
| | carbon material BET specific surface area (m$^2$/g) | (parts by mass based on 100 parts by mass of porous carbon material) | kinetic viscosity (mm$^2$/s) | (parts by mass based on 100 parts by mass of porous carbon material) | (parts by mass based on 100 parts by mass of insulating material) | BET specific surface area (m$^2$/g) |
| Example 1 | 1630 | 2.00 | 100 | 0.02 | 1.00 | 1510 |
| Example 2 | 1630 | 2.00 | 100 | 0.02 | 1.00 | 1535 |
| Example 3 | 1630 | 2.00 | 100 | 0.02 | 1.00 | 1540 |
| Reference Example 1 | 1630 | 0.00 | — | 0.00 | — | 1630 |

TABLE 1-continued

| | porous carbon material for electrodes | | | | | |
| --- | --- | --- | --- | --- | --- | --- |
| | formulation | | | | | |
| | porous | insulating material | | conductive additive | | |
| | carbon material BET specific surface area (m²/g) | (parts by mass based on 100 parts by mass of porous carbon material) | kinetic viscosity (mm²/s) | (parts by mass based on 100 parts by mass of porous carbon material) | (parts by mass based on 100 parts by mass of insulating material) | BET specific surface area (m²/g) |
| Comparative Example 1 | 1630 | 2.00 | 100 | 0.00 | 0.00 | 1530 |
| Comparative Example 2 | 1630 | 0.30 | 100 | 0.02 | 6.67 | 1571 |
| Example 4 | 1630 | 1.00 | 100 | 0.02 | 2.00 | 1546 |
| Example 5 | 1630 | 3.00 | 100 | 0.02 | 0.67 | 1434 |
| Example 6 | 1630 | 5.00 | 100 | 0.02 | 0.40 | 1323 |
| Comparative Example 3 | 1630 | 7.00 | 100 | 0.02 | 0.29 | 1212 |
| Comparative Example 4 | 1630 | 2.00 | 0.65 | 0.02 | 1.00 | 1609 |
| Example 7 | 1630 | 2.00 | 2 | 0.02 | 1.00 | 1523 |
| Example 8 | 1630 | 2.00 | 50 | 0.02 | 1.00 | 1540 |
| Example 9 | 1630 | 2.00 | 1000 | 0.02 | 1.00 | 1537 |
| Comparative Example 5 | 1630 | 2.00 | 100 | 0.002 | 0.10 | 1521 |
| Example 10 | 1630 | 2.00 | 100 | 0.05 | 2.50 | 1510 |
| Example 11 | 1630 | 2.00 | 100 | 0.20 | 10.00 | 1503 |
| Comparative Example 6 | 1630 | 2.00 | 100 | 0.40 | 20.00 | 1496 |
| Reference Example 2 | 1290 | 0.00 | — | 0.00 | — | 1290 |
| Reference Example 3 | 1450 | 0.00 | — | 0.00 | — | 1450 |
| Example 12 | 1450 | 2.00 | 100 | 0.02 | 1.00 | 1343 |
| Reference Example 4 | 1862 | 0.00 | — | 0.00 | — | 1862 |
| Example 13 | 1862 | 2.00 | 100 | 0.02 | 1.00 | 1725 |
| Reference Example 5 | 2069 | 0.00 | — | 0.00 | — | 2069 |
| Example 14 | 2069 | 2.00 | 100 | 0.02 | 1.00 | 1917 |
| Reference Example 6 | 2224 | 0.00 | — | 0.00 | — | 2224 |
| Comparative Example 7 | 2224 | 2.00 | 100 | 0.02 | 1.00 | 2078 |
| Example 15 | 1630 | 2.00 | 100 | 0.02 | 1.00 | 1510 |
| Example 16 | 1630 | 2.00 | 100 | 0.20 | 10.00 | 1503 |
| Reference Example 7 | 1630 | 0.00 | — | 0.00 | — | 1630 |
| Comparative Example 8 | 1630 | 2.00 | 100 | 0.00 | 0.00 | 1530 |

TABLE 2

| | electrostatic capacitance per volume 25° C. (F/cc) | | electrostatic capacitance per volume −30° C. (F/cc) | | capacity retention rate (%) | | gas generation amount (cc/g) |
| --- | --- | --- | --- | --- | --- | --- | --- |
| | 0 h | 400 h | 0 h | 400 h | | | 400 h |
| | before endurance test | after endurance test | before endurance test | after endurance test | after 400 h 25° C. | after 400 h −30° C. | after endurance test |
| Example 1 | 15.6 | 13.2 | 12.8 | 6.7 | 84.9 | 52.4 | 29 |
| Example 2 | 15.6 | 13.1 | 13.0 | 6.7 | 84.0 | 51.0 | 27 |
| Example 3 | 15.4 | 13.1 | 13.2 | 6.9 | 85.0 | 52.4 | 30 |
| Reference Example 1 | 15.1 | 11.5 | 9.5 | 3.6 | 76.2 | 38.1 | 60 |
| Comparative Example 1 | 15.1 | 12.1 | 11.4 | 5.2 | 80.0 | 45.4 | 39 |
| Comparative Example 2 | 15.2 | 12.0 | 10.2 | 4.5 | 78.8 | 43.7 | 52 |
| Example 4 | 15.5 | 13.2 | 11.9 | 6.4 | 84.7 | 54.0 | 34 |
| Example 5 | 15.4 | 12.6 | 11.7 | 6.1 | 82.0 | 52.0 | 31 |
| Example 6 | 15.1 | 12.0 | 11.0 | 5.5 | 79.5 | 50.4 | 29 |
| Comparative Example 3 | 14.6 | 11.0 | 10.4 | 4.7 | 75.5 | 45.2 | 28 |
| Comparative Example 4 | 15.2 | 11.8 | 9.9 | 4.1 | 77.9 | 41.5 | 54 |
| Example 7 | 15.7 | 13.2 | 11.6 | 6.1 | 84.6 | 52.7 | 30 |
| Example 8 | 15.7 | 13.0 | 11.8 | 6.4 | 83.1 | 54.5 | 31 |
| Example 9 | 15.4 | 12.4 | 10.9 | 5.5 | 80.7 | 50.5 | 36 |
| Comparative Example 5 | 15.1 | 12.1 | 9.2 | 4.1 | 80.0 | 44.9 | 47 |
| Example 10 | 15.4 | 13.1 | 12.7 | 7.1 | 86.4 | 57.6 | 29 |
| Example 11 | 15.7 | 13.9 | 13.0 | 7.7 | 88.7 | 58.7 | 28 |
| Comparative Example 6 | 15.8 | 12.9 | 10.3 | 4.7 | 81.6 | 45.2 | 48 |
| Reference Example 2 | 6.5 | 4.5 | 3.5 | 1.2 | 68 | 35 | 47 |
| Reference Example 3 | 13.1 | 9.0 | 6.9 | 2.5 | 68 | 35 | 59 |
| Example 12 | 13.5 | 10.3 | 8.9 | 4.6 | 76 | 51 | 36 |
| Reference Example 4 | 14.5 | 11.4 | 10.1 | 5.5 | 79 | 55 | 58 |
| Example 13 | 14.8 | 12.8 | 12.4 | 8.1 | 87 | 65 | 29 |
| Reference Example 5 | 13.8 | 11.3 | 10.9 | 8.1 | 81 | 68 | 56 |

TABLE 2-continued

|  | electrostatic capacitance per volume 25° C. (F/cc) | | electrostatic capacitance per volume −30° C. (F/cc) | | capacity retention rate (%) | | gas generation amount (cc/g) |
| --- | --- | --- | --- | --- | --- | --- | --- |
|  | 0 h | 400 h | 0 h | 400 h | | | 400 h |
|  | before endurance test | after endurance test | before endurance test | after endurance test | after 400 h 25° C. | after 400 h −30° C. | after endurance test |
| Example 14 | 13.7 | 11.7 | 11.9 | 9.1 | 86 | 76 | 31 |
| Reference Example 6 | 13.2 | 11.2 | 11.5 | 10.1 | 85 | 88 | 55 |
| Comparative Example 7 | 12.9 | 11.1 | 11.5 | 10.1 | 86 | 88 | 28 |
| Example 15 | 15.0 | 13.1 | 15.0 | 12.0 | 87.7 | 80.4 | 31 |
| Example 16 | 15.0 | 13.2 | 14.9 | 12.3 | 87.8 | 82.8 | 28 |
| Reference Example 7 | 15.3 | 10.2 | 14.5 | 7.0 | 66.6 | 48.0 | 43 |
| Comparative Example 8 | 15.0 | 12.9 | 14.4 | 11.1 | 85.5 | 76.6 | 42 |

TABLE 3

|  | |Z|/Ohm (1000 Hz): −30° C. | | |Z|/Ohm (1 Hz): −30° C. | | difference in resistance, 1-1000 Hz: −30° C. | |
| --- | --- | --- | --- | --- | --- | --- |
|  | 0 h | 400 h | 0 h | 400 h | 0 h | 400 h |
| Example 1 | 1.97 | 2.76 | 3.11 | 5.28 | 1.14 | 2.52 |
| Example 2 | 2.07 | 3.36 | 3.01 | 5.97 | 0.94 | 2.60 |
| Example 3 | 2.10 | 3.78 | 3.18 | 6.09 | 1.08 | 2.31 |
| Reference Example 1 | 2.07 | 4.64 | 3.77 | 8.95 | 1.70 | 4.31 |
| Comparative Example 1 | 2.10 | 3.36 | 3.32 | 6.84 | 1.22 | 3.48 |
| Comparative Example 2 | 2.05 | 4.00 | 3.65 | 7.64 | 1.60 | 3.63 |
| Example 4 | 1.98 | 2.52 | 3.35 | 4.57 | 1.37 | 2.06 |
| Example 5 | 1.87 | 2.90 | 3.42 | 5.38 | 1.55 | 2.48 |
| Example 6 | 1.94 | 2.89 | 3.58 | 5.66 | 1.64 | 2.77 |
| Comparative Example 3 | 2.05 | 2.88 | 3.83 | 6.08 | 1.78 | 3.20 |
| Comparative Example 4 | 2.05 | 4.32 | 3.64 | 8.20 | 1.59 | 3.88 |
| Example 7 | 1.94 | 3.03 | 3.11 | 5.20 | 1.17 | 2.17 |
| Example 8 | 2.14 | 3.28 | 3.39 | 5.57 | 1.25 | 2.29 |
| Example 9 | 2.11 | 3.46 | 3.47 | 6.06 | 1.35 | 2.60 |
| Comparative Example 5 | 2.19 | 3.57 | 3.87 | 7.18 | 1.68 | 3.61 |
| Example 10 | 2.01 | 3.47 | 3.19 | 5.87 | 1.18 | 2.40 |
| Example 11 | 2.01 | 2.90 | 2.97 | 5.11 | 0.96 | 2.21 |
| Comparative Example 6 | 2.40 | 3.55 | 4.21 | 6.71 | 1.81 | 3.16 |
| Reference Example 2 | 2.11 | 2.91 | 4.17 | 8.30 | 2.06 | 5.39 |
| Reference Example 3 | 2.15 | 2.97 | 4.12 | 8.22 | 1.97 | 5.25 |
| Example 12 | 2.05 | 2.30 | 3.41 | 6.31 | 1.36 | 4.01 |
| Reference Example 4 | 2.08 | 4.07 | 3.49 | 7.36 | 1.40 | 3.29 |
| Example 13 | 2.02 | 2.74 | 3.01 | 4.61 | 0.99 | 1.87 |
| Reference Example 5 | 2.09 | 3.48 | 3.22 | 5.75 | 1.13 | 2.27 |
| Example 14 | 2.06 | 2.72 | 2.93 | 4.11 | 0.87 | 1.39 |
| Reference Example 6 | 2.10 | 2.74 | 2.82 | 3.65 | 0.72 | 0.91 |
| Comparative Example 7 | 2.09 | 2.71 | 2.85 | 3.61 | 0.75 | 0.91 |
| Example 15 | 0.71 | 1.28 | 0.82 | 1.59 | 0.12 | 0.32 |
| Example 16 | 1.00 | 1.46 | 1.16 | 1.80 | 0.17 | 0.34 |
| Reference Example 7 | 0.96 | 4.88 | 1.20 | 7.29 | 0.24 | 2.41 |
| Comparative Example 8 | 0.98 | 1.48 | 1.19 | 2.03 | 0.21 | 0.55 |

(Evaluation of Initial Performance and Performance after Endurance Test for Electric Double Layer Capacitor)

When a durability test is carried out so as to evaluate the performance of a capacitor, generally, capacity and resistance are measured at normal temperature (25° C.) before and after an accelerated test and the difference between them is measured. However, the evaluation at normal temperature requires a long-term accelerated test for confirming a deterioration phenomenon (for example, it takes 2000 hours when a voltage stress test is carried out at 60° C.). When the evaluation of capacity and resistance is carried out at low temperature, the deterioration phenomenon can be compared and confirmed earlier in comparison to that at normal temperature. In this regard, the deterioration of capacitor is caused by the deterioration in components thereof (electrode, electrolytic solution, binder or the like) due to an electrochemical reaction.

Specifically, the following reactions are mentioned;
(1) decomposition of the electrolytic solution;
(2) generation of hydrofluoric acid and side reaction which are caused by the decomposition of water remained in the porous carbon material and/or the electrolytic solution;
(3) change in pore size or blockage of pore due to generation of SEI (Solid electrolyte interface) coating at the interface of the electrode;
(4) gas generation due to decomposition of remaining water, oxidation of functional groups comprised in the surface of the porous carbon material, and deterioration of the electrolytic solution.

These phenomena cause the deterioration of capacitor such as increase in resistance, decrease in electrostatic capacitance and expansion of cell due to the gas generation.

Particularly, when the comparative measurement is carried out at low temperature, it is considered that the low temperature increases the viscosity of the electrolytic solution, and thus, the deterioration of the electrode material, the deterioration of electrode interface and/or the deterioration of the electrolytic solution are significantly reflected in the evaluation of capacity, resistance or the like. In terms of such a view, after conducting an endurance test (stressing at 60° C. and 3V for certain hours), the degree of deterioration is compared mainly at −30° C. in the present invention so as to compare and examine the deterioration phenomenon clearly.

As shown in Table 2, the electric double layer capacitor which was prepared from the polarized electrode using the porous carbon material for electrodes according to the present invention achieves the same or higher initial electrostatic capacitance at 25° C. and −30° C. in comparison to the electric double layer capacitor which was prepared from the porous carbon material for electrodes comprising only a porous carbon material used as a base material of the porous carbon material for electrodes and the insulating material. When the insulating material is carried on the porous carbon material, pores of the porous carbon material are blocked by the insulating material, and thus, electrostatic capacitance is decreased. However, it is shown that such a decrease in electrostatic capacitance is not almost observed in the electric double layer capacitor prepared from the polarized electrode using the porous carbon material for electrodes according to the present invention. Furthermore, high capacity retention rate is shown after the endurance test, and the gas generation is inhibited. As shown in Table 3, increase in resistance is inhibited and the durability is significantly improved in the electric double layer capacitor prepared from the polarized electrode using the porous carbon material for electrodes according to the present invention. From these, it is apparent that energy storage devices which are excellent in durability can be obtained by using the porous carbon material for electrode according to the present invention.

Figure 6:
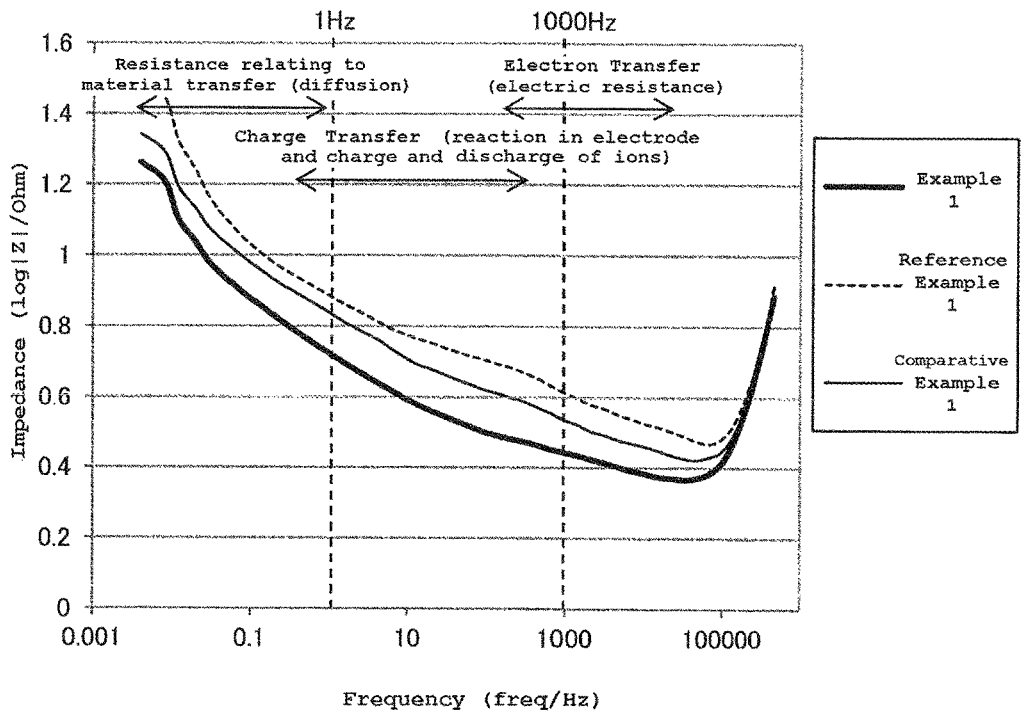
FIG. 6 shows a relation (Bode-Plot) between: frequency; and resistance value, which is measured in AC (alternating-current) impedance measurement at −30° C. under constant voltage, of the porous carbon material for electrodes and the porous carbon material used as a base material of the porous carbon material for electrodes.

FIG. 6 shows a relation (Bode-Plot Figure) between: frequency; and resistance value, which is measured in AC impedance at −30° C. under constant voltage, of the porous carbon material for electrodes and the porous carbon material used as a base material of the porous carbon material for electrodes. Note that, since charge transfer (reaction in electrode and charge and discharge of ions) is deemed to be associated with the durability, the difference in resistance value between 1 Hz and 1000 Hz was calculated as a resistance relating to charge transfer. As shown in FIG. 6, the effect in interface resistance (electric resistance) is shown from the decrease in resistance in the region of high frequency. Furthermore, when Comparative Example 1 is compared with Example 1, wherein they comprise the same amount of the insulating material and the conductive additive in the test electrode, the resistance in Example 1 was smaller than that in Comparative Example 1. Thus, the inhibition of increase in resistance is achieved in the case where the insulating material and the conductive additive are comprised in the porous carbon material for electrodes in comparison to the case where the insulating material is carried on the porous carbon material and then the conductive additive is added thereto.

Figure 7:
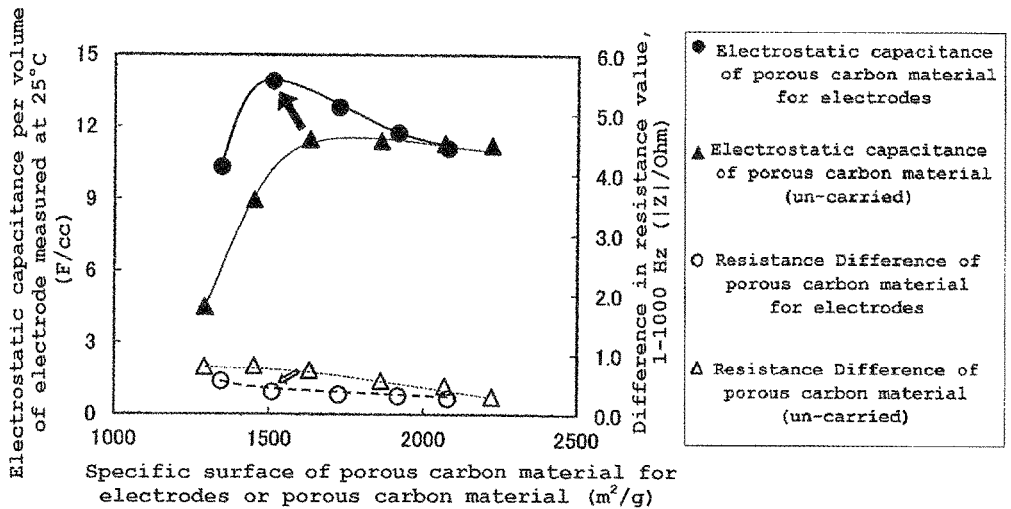
FIG. 7 shows a relation between: specific surface measured for the porous carbon material for electrodes or the porous carbon material used as a base material of the porous carbon material for electrodes; electrostatic capacitance per volume of the electrode measured at 25° C. after an endurance test; and difference in resistance value at 1 Hz and 1000 Hz.
Figure 8:
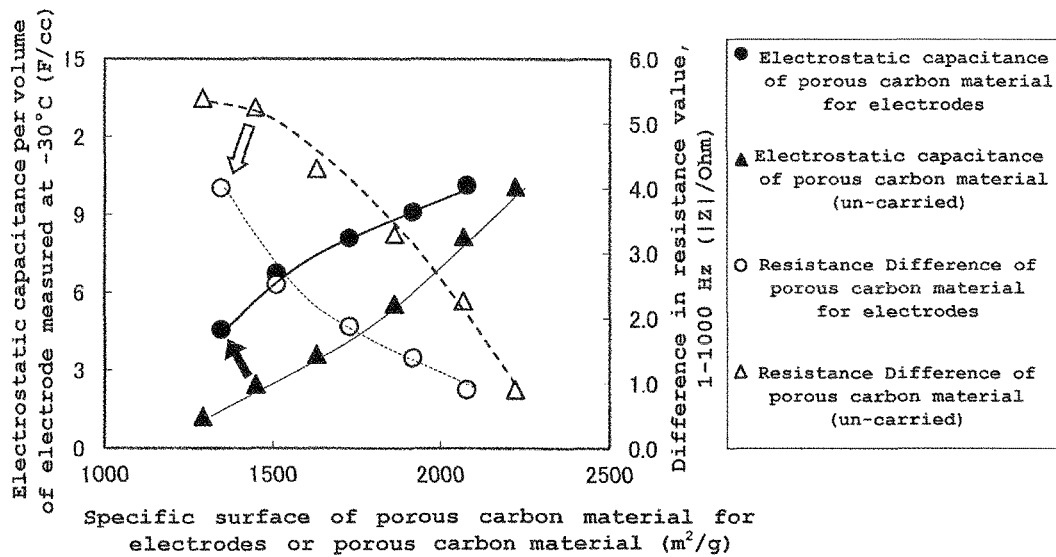
FIG. 8 shows a relation between: specific surface measured for the porous carbon material for electrodes or the porous carbon material used as a base material of the porous carbon material for electrodes; electrostatic capacitance per volume of the electrode measured at −30° C. after an endurance test; and difference in resistance value at 1 Hz and 1000 Hz.

FIG. 7 and FIG. 8 show a relation between: specific surface measured for the porous carbon material for electrodes or the porous carbon material used as a base material of the porous carbon material for electrodes; electrostatic capacitance per volume of an electrode measured at 25° C. or −30° C. after the endurance test, and difference in resistance value at 1 Hz and 1000 Hz. In FIG. 7 and FIG. 8, the plots relating to the porous carbon material for electrodes correspond to Example 12, Example 1, Example 13, Example 14, and Comparative Example 7 in order of lower specific surface of the porous carbon material for electrodes. The plots relating to the porous carbon material (un-carried) correspond to Reference Example 2, Reference Example 3, Reference Example 1, Reference Example 4, Reference Example 5, and Reference Example 6 in order of lower specific surface of the porous carbon material. Electrodes which were prepared by the use of the porous carbon materials (which do not carry the insulating material or the conductive additive) comprised in the porous carbon material for electrodes of Example 12, Example 1, Example 13, Example 14, and Comparative Example 7 respectively correspond to Reference Example 3, Reference Example 1, Reference Example 4, Reference Example 5 and Reference Example 6. As shown in FIG. 7 and FIG. 8, the electrostatic capacitance is significantly decreased when the specific surface of the porous carbon material is less than 1300 $m^2/g$.

Figure 9:
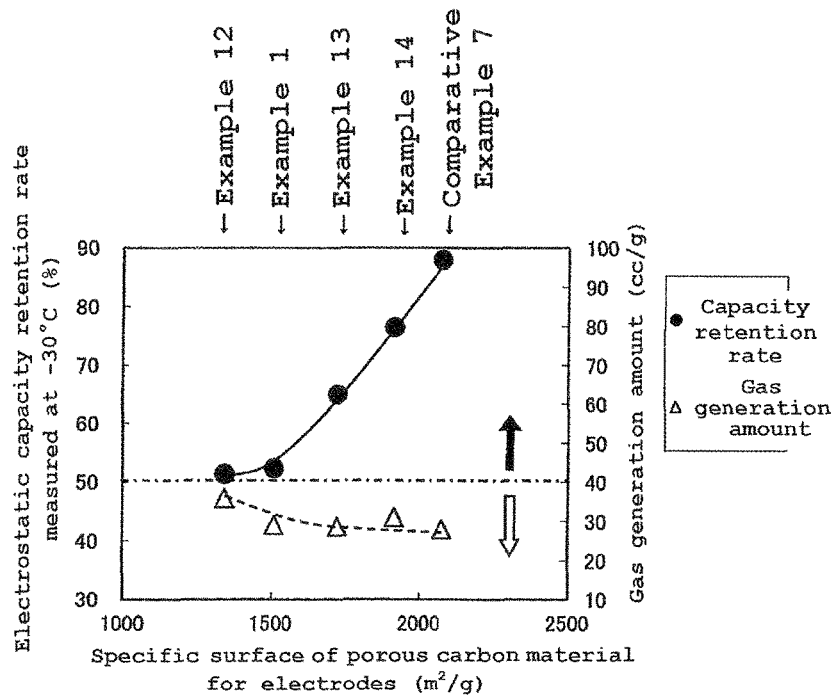
FIG. 9 shows a relation between: specific surface measured for the porous carbon material for electrodes; electrostatic capacity retention measured at −30° C. after an endurance test; and a gas generation amount.

As shown in FIG. 9, the electrostatic capacity retention rate increases with increasing the specific surface of the porous carbon material for electrodes. However, as shown in FIG. 7, the electrostatic capacitance at 25° C. is decreased when the specific surface is more than 2050 $m^2/g$, and furthermore, no effect is achieved by carrying the insulating material and the conductive additive. According to these results, it is understood, when the specific surface is less than 1300 $m^2/g$, the capacity is not sufficiently achieved since the pore are blocked. It is also understood, when the specific surface is more than 2050 $m^2/g$, the increase effect in electrostatic capacitance is not achieved.

Figure 10:
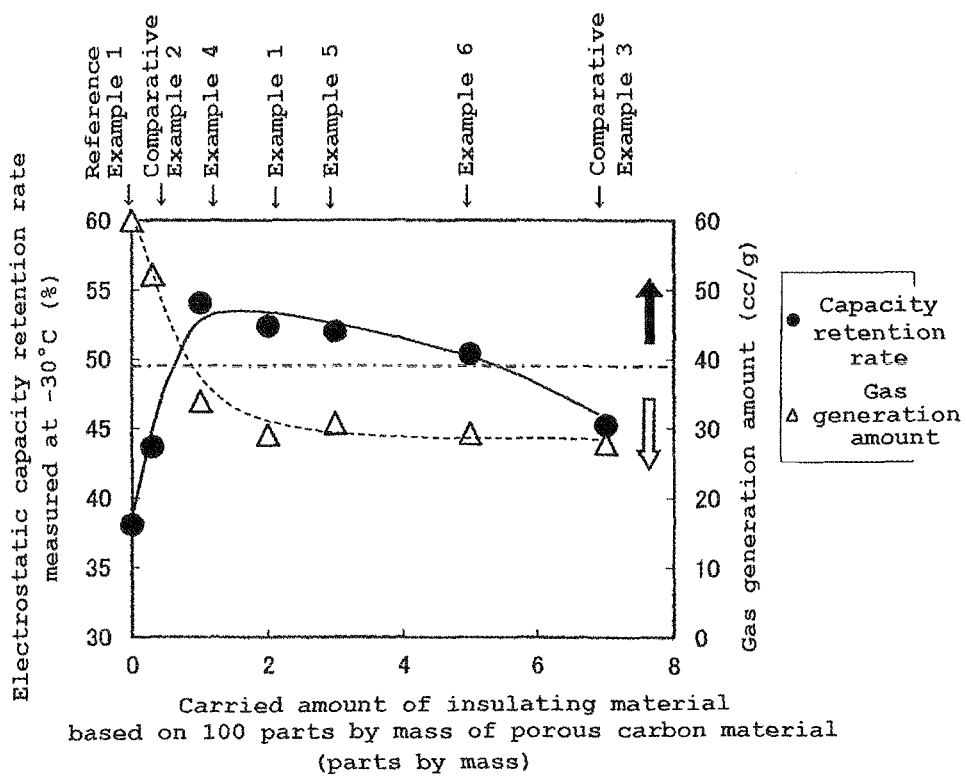
FIG. 10 shows a relation between: a carried amount of the insulating material based on 100 parts by mass of the porous carbon material; electrostatic capacity retention rate measured at −30° C. after an endurance test; and a gas generation amount.
Figure 11:
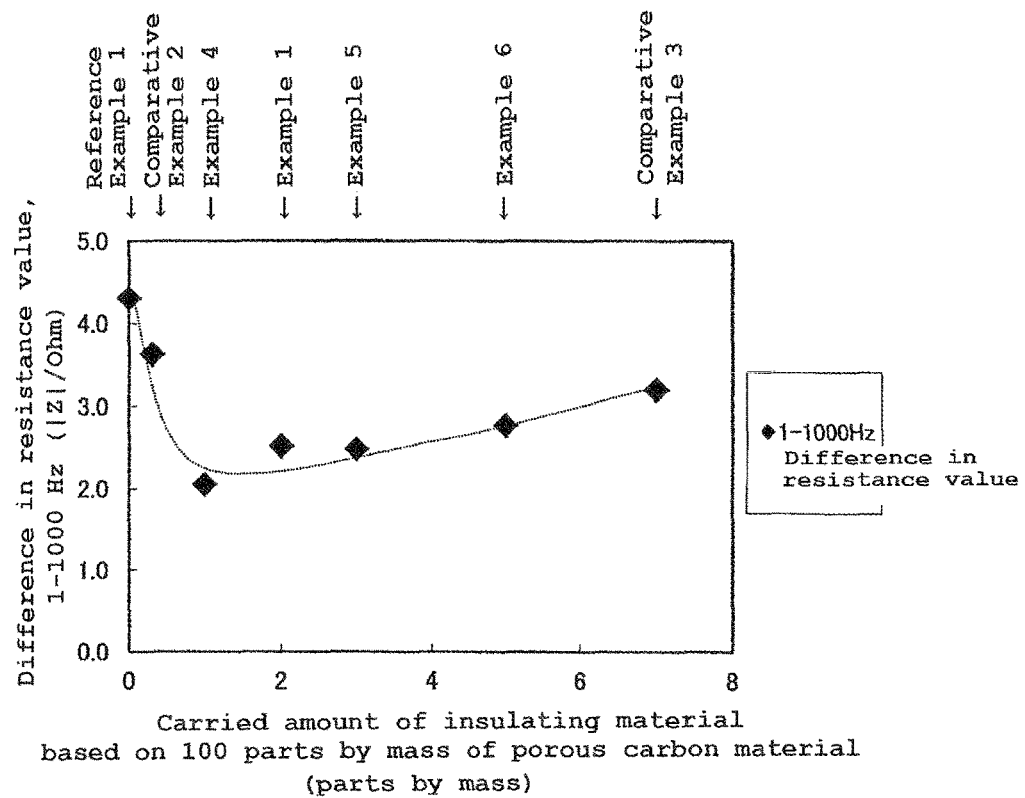
FIG. 11 shows a relation between: a carried amount of the insulating material based on 100 parts by mass of the porous carbon material; and difference in resistance value at 1 Hz and 1000 Hz measured at −30° C. after an endurance test.

As shown in FIG. 10 and FIG. 11, when the amount of the insulating material is 0.5 to 5 parts by mass based on 100 parts by mass of the porous carbon material, the performance retention rate is high and the gas generation amount is decreased. When the amount of the insulating material is less than 0.5 parts by mass based on 100 parts by mass of the porous carbon material, the inhibition of gas generation, increase in performance retention rate, and inhibition in increase of resistance are not sufficiently achieved. When the amount of the insulating material is more than 5 parts by mass based on 100 parts by mass of the porous carbon material, the inhibition of gas generation is saturated, and on the one hand, fine pores of the porous carbon material are blocked, and then, the electrostatic capacitance and the performance retention rate are decreased.

Figure 12:
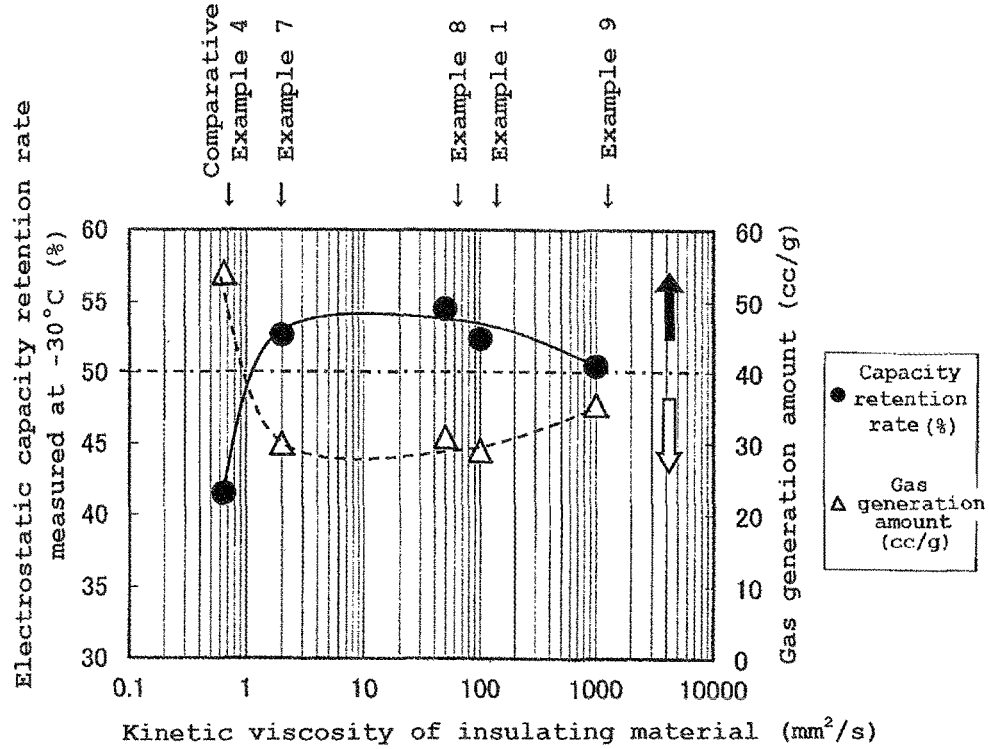
FIG. 12 shows a relation between: a kinetic viscosity of the insulating material; electrostatic capacity retention rate measured at −30° C. after an endurance test; and a gas generation amount.
Figure 13:
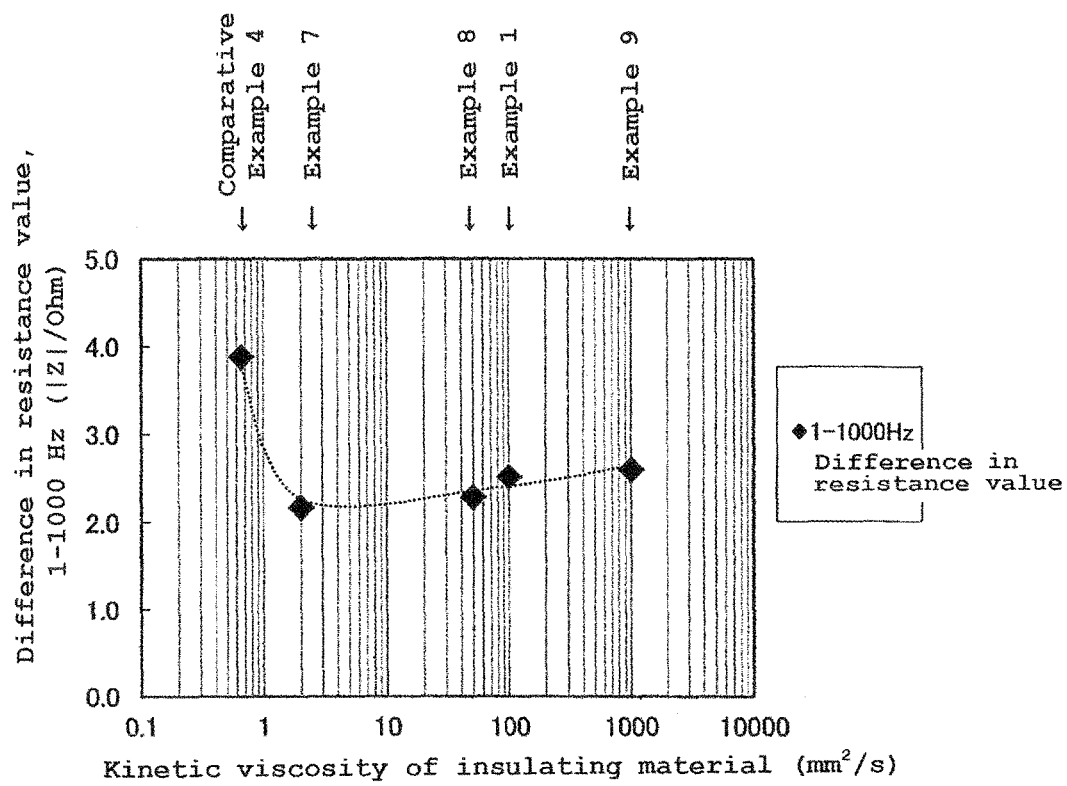
FIG. 13 shows a relation between: a kinetic viscosity of the insulating material; and difference in resistance value at 1 Hz and 1000 Hz measured at −30° C. after an endurance test.

Comparative Example 4 shown in FIG. 12 and FIG. 13 having the lowest kinetic viscosity is a Comparative Example in which an insulating material having a boiling point of less than 150° C. was used. On the other hand, in Examples 1, 7 to 9 using the insulating material having a boiling point of 150° C. or more, the performance retention rate was high and the gas generation amount was decreased. As shown in FIGS. 12 and 13, when the boiling point is less than 150° C., the carried amount of the insulating material is reduced by volatilization thereof due to the temperature during a drying step etc. in the preparation of the electrode using the porous carbon material for electrodes, and thus the effect is reduced. In addition, it is understood to be preferable that when the kinetic viscosity is 1000 $mm^2/s$ or loss, the insulating material can be thinly and uniformly carried since the viscosity is not too high, the pores of the porous carbon material are not blocked, and thus, high electrostatic capacitance is achieved.

Figure 14:
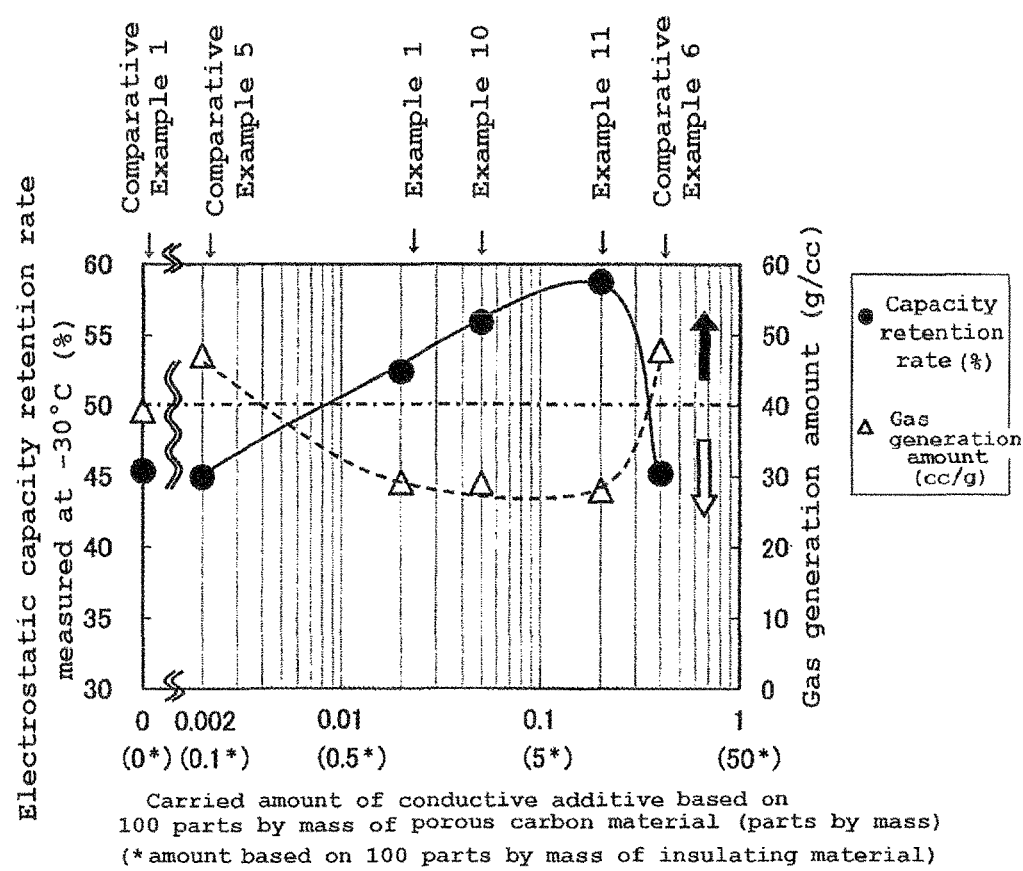
FIG. 14 shows a relation between: a carried amount of the conductive additive; electrostatic capacity retention rate measured at −30° C. after an endurance test; and a gas generation amount.
Figure 15:
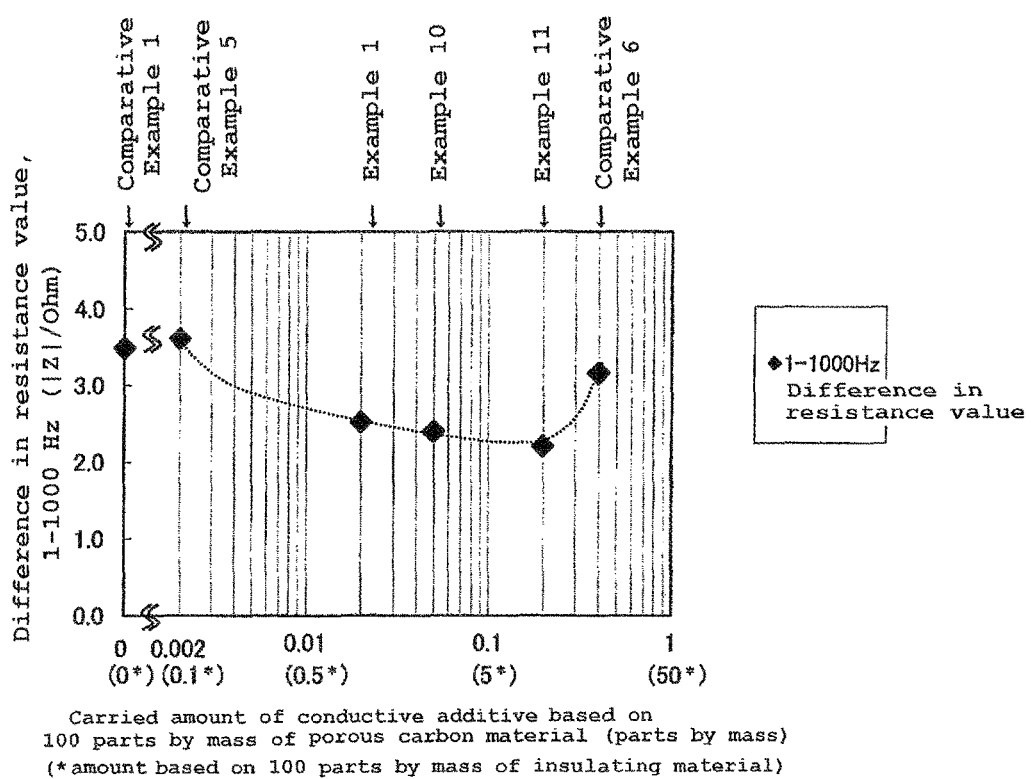
FIG. 15 shows a relation between: a carried amount of the conductive additive; and difference in resistance value at 1 Hz and 1000 Hz measured at −30° C. after an endurance test.

As shown in FIGS. 14 and 15, when the amount of the conductive additive is 0.25 to 15 parts by mass based on 100 parts by mass of the insulating material, the performance retention rate is high and the gas generation amount is decreased. In addition, Examples 1 and 11, in which the insulating material and the conductive additive are carried, are considered to be more excellent in performance retention rate in comparison to Comparative Example 1 in which only the insulating material is carried. Because, electric conduction paths are formed between the porous carbon materials for electrodes in Examples 1 and 11, and the increase in resistance due to the addition of the insulating material is inhibited. However, when the amount of the conductive additive is less than 0.25 parts by mass based on 100 parts by mass of the insulating material which is carried at the same time, the number of the electric conduction paths is not increased, and thus, the inhibition effect in resistance increase is not achieved. When the amount of the conductive additive is more than 15 parts by mass based on the 100 parts by mass of the insulating material which is carried at the same time, the percentage of the conductive additive becomes higher and the disperse ability is reduced, as a result, enough effect is not achieved.

As described above, the present invention achieves the object by using the porous carbon material for electrodes of energy storage which comprises 0.5 to 5 parts by mass of the insulating material having a boiling point of 150° C. or more based on 100 parts by mass of the porous carbon material and 0.25 to 15 parts by mass of the conductive additive based on 100 parts by mass of the insulating material, wherein the insulating material and the conductive additive are carried on the porous carbon material in combination and the porous carbon material has a BET specific surface area of 1300 to 2050 $m^2/g$. Following effects can be achieved: inhibition of adsorption of water in the porous carbon material, which may cause deterioration; inhibition of deterioration of energy storage devices such as deterioration of electrolytic solution, deterioration of electrode and/or deterioration at the interfacial surface of the electrode by reducing the direct contact of the interfacial surface of the porous carbon material with the electrolytic solution. In addition, the increase in resistance due to the addition of the insulating material is inhibited by the conductive additive which is carried on the porous carbon material in combination. Thus, an energy storage device, which is excellent in durability such as high performance retention rate, in which the gas generation amount is reduced and which can be used at high potential, can be obtained.

REFERENCE SIGNS LIST 1 electrode composition
2 electrically conductive adhesive
3 etching aluminum foil
4 tub
5 sealant
6 polarized electrode
7 outer package sheet
8 electric double layer capacitor

What is claimed is:

1. A porous carbon material composition for electrodes of energy storage devices, the porous carbon material composition comprising:
    a porous carbon material;
    0.5 to 5 parts by mass of an insulating material having a boiling point of 150° C. or more based on 100 parts by mass of the porous carbon material; and
    0.25 to 15 parts by mass of a conductive additive based on 100 parts by mass of the insulating material,
    wherein:
    the insulating material and the conductive additive are carried on the porous carbon material in combination; and
    the porous carbon material has a BET specific surface area of 1300 to 2050 $m^2/g$, and
    wherein, kinetic viscosity at 25° C. of the insulating material is 1 to 1000 $mm^2/s$.

2. The porous carbon material composition according to claim 1, wherein pour point of the insulating material is −30° C. or less.

3. The porous carbon material composition according to claim 1, wherein the insulating material is a siloxane compound having siloxane units in a main chain.

4. The porous carbon material composition according to claim 1, wherein a high-molecular compound is also carried in combination.

5. An electrode, comprising the porous carbon material composition of claim 1.

6. An energy storage device, comprising the electrode of claim 5.

7. A method for manufacturing a porous carbon material composition for electrodes of energy storage devices, the method comprising contacting a porous carbon material with an insulating material and a conductive additive,
    wherein:
    the porous carbon material has a BET specific surface area of 1300 to 2050 $m^2/g$,
    kinetic viscosity at 25° C. of the insulating material is 1 to 1000 $mm^2/s$;
    the composition comprises 0.5 to 5 parts by mass of the insulating material having a boiling point of 150° C. or more based on 100 parts by mass of the porous carbon material;
    the composition comprises 0.25 to 15 parts by mass of the conductive additive based on 100 parts by mass of the insulating material; and
    the insulating material and the conductive additive are carried on the porous carbon material.

8. The method according to claim 7, wherein the insulating material and the conductive additive are added to the porous carbon material to be carried on the porous carbon material.

9. The method according to claim 7, wherein a mixture comprising the insulating material and the conductive additive are added to the porous carbon material to be carried on the porous carbon material.

10. The method according to claim 7, wherein the insulating material and the conductive additive are carried on the porous carbon material by dipping the porous carbon material into a mixture comprising the insulating material and the conductive additive.

11. The method according to claim 9, wherein the mixture further comprises a high-molecular compound.

* * * * *